United States Patent
Doyon et al.

(10) Patent No.: US 10,855,469 B2
(45) Date of Patent: Dec. 1, 2020

(54) SECURE ENROLMENT OF SECURITY DEVICE FOR COMMUNICATION WITH SECURITY SERVER

(71) Applicant: GENETEC INC., St-Laurent (CA)

(72) Inventors: Jonathan Doyon, Saint-Laurent (CA); Simon Le Bourdais-Cabana, Dollard-Des-Ormeaux (CA); Sébastien Nadeau, Sainte-Thérèse (CA); Siaka Baro, Laval (CA); Martin Tardif, St-Eustache (CA)

(73) Assignee: GENETEC INC., St-Laurent (CA)

( * ) Notice: Subject to any disclaimer, the term of this patent is extended or adjusted under 35 U.S.C. 154(b) by 163 days.

(21) Appl. No.: 15/761,928

(22) PCT Filed: Aug. 2, 2016

(86) PCT No.: PCT/CA2016/050908
§ 371 (c)(1),
(2) Date: Mar. 21, 2018

(87) PCT Pub. No.: WO2017/049387
PCT Pub. Date: Mar. 30, 2017

(65) Prior Publication Data

US 2018/0270066 A1    Sep. 20, 2018

Related U.S. Application Data

(60) Provisional application No. 62/232,562, filed on Sep. 25, 2015.

(51) Int. Cl.
G06F 21/44        (2013.01)
H04L 9/32         (2006.01)
(Continued)

(52) U.S. Cl.
CPC ........... *H04L 9/3226* (2013.01); *G06F 21/44* (2013.01); *H04L 9/3247* (2013.01);
(Continued)

(58) Field of Classification Search
CPC ........................... G06F 21/44; H04L 63/0853
See application file for complete search history.

(56) References Cited

U.S. PATENT DOCUMENTS 7,496,954 B1 *   2/2009  Himawan ............... G06F 21/41
                                                           726/8
2012/0297206 A1  11/2012 Nord et al.
(Continued)

FOREIGN PATENT DOCUMENTS

EP    2916484 A1    9/2015
EP    3051745 A1    8/2016
(Continued)

OTHER PUBLICATIONS

EP16847674.5 European search opinion dated Apr. 5, 2019.
(Continued)

*Primary Examiner* — Thaddeus J Plecha
(74) *Attorney, Agent, or Firm* — Anglehart et al.

(57) ABSTRACT

Provided is novel technology for secure security data transmission and more particularly for registering network-enabled security devices such as IP cameras to a security server over a public network such as to a cloud-based security service. An enrolment server is provided that is logged into using a computing device to request and receive an activation code for the security device. The activation code is then provided to the security device, e.g. directly by the computing device. The Security device authenticates itself based on the activation code and in one example provides a public key (Continued)

that will be used to verify its registration. Data transmissions by the device are secured in part on the basis of its registration.

19 Claims, 16 Drawing Sheets

(51) Int. Cl.
| | |
|---|---|
| *H04L 29/06* | (2006.01) |
| *H04W 12/06* | (2009.01) |
| *H04N 7/18* | (2006.01) |
| *H04N 21/258* | (2011.01) |
| *H04N 21/60* | (2011.01) |
| *H04L 12/46* | (2006.01) |
| *H04L 29/08* | (2006.01) |
| *H04N 21/6334* | (2011.01) |
| *H04W 4/70* | (2018.01) |

(52) U.S. Cl.
CPC ........ *H04L 12/4633* (2013.01); *H04L 63/061* (2013.01); *H04L 63/083* (2013.01); *H04L 63/0853* (2013.01); *H04L 63/12* (2013.01); *H04L 63/18* (2013.01); *H04L 67/1008* (2013.01); *H04N 7/18* (2013.01); *H04N 21/25816* (2013.01); *H04N 21/60* (2013.01); *H04N 21/63345* (2013.01); *H04W 4/70* (2018.02); *H04W 12/06* (2013.01); *H04L 67/02* (2013.01); *H04L 67/1002* (2013.01)

(56) References Cited

U.S. PATENT DOCUMENTS

| | | | |
|---|---|---|---|
| 2013/0333008 A1* | 12/2013 | Tapling | H04L 63/04 726/7 |
| 2014/0090037 A1* | 3/2014 | Singh | H04L 63/0815 726/7 |
| 2014/0245396 A1 | 8/2014 | Oberheide et al. | |
| 2015/0089624 A1* | 3/2015 | Kim | H04L 12/12 726/9 |
| 2015/0172290 A1* | 6/2015 | Lai | H04L 9/321 713/155 |
| 2015/0215297 A1* | 7/2015 | Rathod | H04L 63/062 726/7 |
| 2015/0222601 A1 | 8/2015 | Metz et al. | |
| 2015/0256542 A1 | 9/2015 | Alasingara et al. | |
| 2020/0193787 A1* | 6/2020 | Jolivet | G08B 13/19656 |

FOREIGN PATENT DOCUMENTS

| | | |
|---|---|---|
| KR | 20150033515 A1 | 4/2015 |
| WO | WO 2015/041500 A1 | 3/2015 |

OTHER PUBLICATIONS

EP16847674.5 Information on Search Strategy dated Apr. 5, 20190405.
EP16847674.5 Supplementary European search report dated Apr. 5, 2019.
International application No. PCT/CA2016/050908 International Preliminary Report on Patentability Chapter I dated Mar. 27, 2018.
International application No. PCT/CA2016/050908 International Search Report dated Oct. 25, 2016.
International application No. PCT/CA2016/050908 Search Strategy dated Oct. 25, 2016.
International application No. PCT/CA2016/050908 Written Opinion of the International Searching Authority dated Oct. 25, 2016.
European application No. 16847674.5 examination report dated Feb. 5, 2020.

* cited by examiner

SECURE ENROLMENT OF SECURITY DEVICE FOR COMMUNICATION WITH SECURITY SERVER

TECHNICAL FIELD

This patent application relates to the field of electronic security, and more particularly to communications between servers and security devices and more particularly to the communication between security servers and security devices when such communications take place over a public network. The novel solution provided concerns in some examples enrolment of the device with an enrolment server that authenticates the device.

BACKGROUND

In the field of electronic security, security device such as security cameras generate security data, e.g. video footage, which is typically provided to a security server for viewing and/or storage. When the security server is on-site, and the communications between the server and security devices are closed, a degree of safety is provided by the fact that only an on-site technician can add a device to the security system and the fact that the proper device is installed and running properly can be physically verified.

Network-enabled security devices can transmit security data over networks e.g. using known network protocols. For example, IP cameras can record footage and transmit it to a remote server over a network. Thus a network-enabled security device can be configured to transmit its security data (e.g. video data) directly to a server using a network infrastructure. This means that rather than providing a direct connection between camera and server, a data network may be provided or an existing data network may be used to route security data from network-enabled security devices to the security server. If the security server is provided locally and if the security devices are within close proximity, the integrity of the connection between the security server and the security devices and the correct use/registration of these security devices can be helped by physical inspection.

Increasingly, however, users of security systems are turning to cloud-based solutions for storing and otherwise processing security data. For a variety of reasons, businesses or other entities turn to cloud-provided security servers. This can be, for example, to avoid the need to run and maintain a security server locally, where cloud servers are provided by a dedicated company. This can also be for scalability and redundancy reason.

In light of this reality, security issues have been discovered and solutions invented as described below.

SUMMARY

Applicant has made a number of discoveries that taken alone or in combination can provide advantages over the state-of-the-art approaches.

The ability to run security server in a cloud-based environment and the existence of network-enabled security devices makes it desirable to have a cloud-based security server and to configure network-enabled security devices to communicate with the cloud-based security server to transmit thereto security data. However, in such an environment extra care must be taken with respect to security devices. When registering a device with a security server, care must be taken to ensure that the device is a genuine security device, authorized to interact with the security sever by the competent entity. For example, where cloud-based security server services are provided to users by a security company, care must be taken to ensure that new devices being connected to the server are genuine and approved by the user/client.

When registration of a device is conducted by a user, malevolence or human error can cause errors that lead to improper registrations.

A solution to these problems is to provide an enrolment server that communicates with the security device, e.g. IP camera, directly. To that end, a communication between the server and the security device is established. In one example, a user may communicate with the enrolment server and provide credentials, e.g. security account credentials, to identify itself and request registration of a new security device to communicate with a security server. In response, the enrolment server provides the user with an activation code. The activation code may be a one-time code, which may be generated by the enrolment server and which may be valid only for a certain period of time. The user may also provide details of the security device, e.g. a serial number or MAC address, when requesting registration, and the enrolment server may associate the activation code with the particular security device as identified by the details provided.

To communicate with the enrolment server, the user may be using a computing device such as a computer, tablet or mobile phone. The enrolment server may be located remotely to the user and may be reachable over the internet. The enrolment server may be provided, for example, by a security company providing security servers for customers, e.g. cloud-based servers, as a service for registering devices on the customers' servers.

Continuing with the above example, the user may then communicate the activation code received from the enrolment server to the security device itself. For example, a user may do this by way of an input device provided on the security device. Many security devices, such as cameras, don't typically have suitable input devices. In one example, the security device may communicate with a computing device, e.g. the one used by the user to communicate with the enrolment server or another computer/phone/etc. using a data interface. For example, the security device may communicate with the computer over the camera's network interface. In one example, the camera instantiates a web server for the user's computer which provides a web page in which the user can enter the activation code. The web server may also provide to the computing device with the enrolment server address (which may be pre-programmed into the security device) such that safely registering a security device may be as simple as buying the security device, connecting to it and following registration instructions provided by the device.

So from the computing device, the activation code is provided to the security device by data connection. The security device may then communicate with the enrolment server directly. Upon establishing communication with the enrolment server, the enrolment server identifies the security device. If identification of the security device was left up to a human, e.g. communicating separately with the enrolment server to confirm that a security device is being registered, this would leave open the possibility of mischief or mistakes. For example, even if the human is duly authorized to register new devices, the enrolment server may not know with certainty that the security device with which it is communicating is indeed the right one. Even if identification data for the device are provided to the enrolment server, there is still the possibility that the security device communicating with the enrolment server is a spoof. In this example, however, by communicating the activation code directly to the device, when the device communicates with the enrolment server, it may itself provide the activation code to the enrolment server in the same communication or communications with which it identifies itself to the enrolment server. Thus the enrolment server may have certainty that the device it is communicating to is the one to which the activation code applies, and by extension the one to which the registration request applied.

As such, by providing a novel enrolment server and security devices that undertake novel methods to communicate directly together in machine-to-machine communication without intermediation, e.g. by a human, secure device authentication and registration is possible, which in turn leads to secure transmissions from the security device to the security server.

For its part, the security server may be provided separately. Typically in cloud-based servers, communications with the security server may in fact be with one of many possible servers which particular one being selected by a load-balancing server.

In response to successful authentication of the device, the enrolment server may provide the device with an address for communicating with the security server, when the security server is separate from the enrolment server. This may be the address, e.g. IP address, of the security server itself, but in the example above, it may be the address of a load-balancing server. Alternatively in other (e.g. smaller-scale) the enrolment server may also be the security server itself. Other details may be provided to the device by the enrolment server, such as an account identifier or other data to identify itself to the security or load balancing server or the account with which its security data must be associated, or other details.

Having authenticated the security device as the one that was duly registered, the enrolment server now creates a suitable mechanism for identifying it as such henceforth. The enrolment server creates a consultable indication that the device has been authenticated that can be consulted when necessary, e.g. when the device communicates security data to the security server. In one example, the security device has a public-private encryption key pair and the public key of the security device is provided by the security device along with the activation code to the enrolment server. The security device may then sign communications with the private encryption key. As such, the consultable indication may be, or comprise, the device's public key. The public key may be used to verify the signature.

The consultable indication in one example is stored on the enrolment server. When the security server receives security data from the device, it may communicate with the enrolment server securely to consult the consultable indication to confirm registration/authentication of the security device and thereby authenticate the security data transmission received from the security device. The security server and enrolment server may have a trusted relationship. This consultation may be done at every security data transmission or the security server may store in its memory the result of the consultation, e.g. for a certain period of time, to avoid having to overburden the enrolment server.

Alternatively, the load-balancing server may be in charge of authenticating security data transmissions. In one particular example, the load-balancing server receives a request/an attempt to communicate security data from the security device and first verifies the authentication of the device in the manner described above. If it is found that the security device was duly authenticated, then the security transmissions from the security device are authenticated. To that end, the load-balancing server may provide the security device with connection parameters for establishing the security data transmission with a security server. The connection parameters may include a security server address and secret connection parameters such that a connection established with such parameters serves as proof to the security server that the device's security transmissions were authenticated by the load-balancing server. For example, the connection parameters may include secret codes, passwords or encryption details for communicating with the security server. In one embodiment, the connection established between the security device and the security server is an SSH or TLS connection and the load-balancing server provides the parameters therefor. In one particular example, the connection parameters may include a temporary certificate which has validity restrictions (e.g. one-time use) to establish a secure connection with a given security server.

Alternatively still, upon authentication, the enrolment server may send the consultable indication to the security server and/or load-balancing server if present to be stored and consulted there.

Thus a secure system for registering a security device and authenticating security transmissions as originating from a securely registered device is provided. Other embodiments, example and details are provided herein.

In one example is provided a method for establishing a secure connection between a network-enabled security device and a security server to enable the communication of encrypted security data from the security device to the security server. The method comprises providing an enrolment server on a public network having a known network address. The method further comprises over a first network connection using a network communication protocol between the enrollment server and a computing device, receiving at the enrolment server from the computing device authentication data. The method further comprises at the enrolment server executing program code to automatically authenticate the first network connection on the basis of the authentication data and upon authentication of the first connection, transmit an activation code to the computing device. The method further comprises over a second network connection between the enrollment server and the security device, receiving at the enrolment server from the security device the activation code and a public encryption key of the security device. The method further comprises at the enrolment server executing program code to automatically verify that the activation code received from the security device matches the activation code transmitted to the computing device, and upon successful verification that the activation code received from the security device matches the activation code transmitted to the computing device creating in a computer-readable memory a consultable indication that the security device has been authenticated, wherein a security data transmission from the security devices is authenticated by consulting the indication to confirm that the security device has been authenticated.

In an example may also be provided a method for enabling surveillance communication between a network-enabled security device and a security server. The method comprises establishing a data connection with a computing device and: a) transmitting from the security device to the computer device over the data connection between the security device and the computing device enrolment connection parameters with which to provide the computing device with network communication with the enrolment server; and b) receiving at the security device over the data connection between the security device and the computing device an activation code from the computing device. The method further comprises establishing network communication with an enrolment server on a public network using a network protocol and transmitting to the enrollment server the activation code received from the computing device and the public encryption key from a public-private encryption key pair. The method further comprises receiving over the public network from the enrollment server surveillance connection parameters for establishing a connection with the security server. The method further comprises establishing network communication between the security device and the security server using the surveillance connection parameters received from the enrolment server and transmitting to the security server security data signed with the private encryption key.

In an example may also be provided an enrolment server for establishing a secure connection between a network-enabled security device and a security server to enable the communication of encrypted security data from the security device to the security server. The enrolment server comprises network interface hardware configured for communication over a data network. The enrolment server also comprises a processing entity in communication with the network interface and configured by program code stored in a computer-readable storage accessible by the processing device instructing the processing device to: a) establish a first network connection over the network interface hardware using a network communication protocol with a remote computing device, b) process data received from the remote computing device over the first network connection to derive therefrom authentication data provided in the data received from the remote computing device, c) perform an authentication of the first network connection on the basis of the authentication data, d) upon authentication of the first connection, cause network interface hardware to transmit to the computing device an activation code, e) establish a second network connection over the network interface hardware with the security device, f) process data received from the security device over the second network connection to derive therefrom the activation code and a public encryption key of the security device provided in the data received from the security device, and g) perform a verification that the activation code received from the security device matches the activation code transmitted to the computing device, and upon successful verification that the activation code received from the security device matches the activation code transmitted to the computing device create in a computer-readable memory a consultable indication that the security device has been authenticated, wherein a security data transmission from the security devices is authenticated by consulting the indication to confirm that the security device has been authenticated.

In an example may also be provided a network-enabled security device for securely transmitting security data to a security server over a public network. The network-enabled security device may comprise network interface hardware configured for communication over a data network. The network-enabled security device may also comprise processing logic in communication with the network interface. The processing logic may be configure to establish a data connection with a computing device and; a) transmit from the security device to the computer device over the data connection between the security device and the computing device enrolment connection parameters with which to provide the computing device with network communication with the enrolment server; and b) receive at the security device over the data connection between the security device and the computing device an activation code from the computing device. The processing logic may also be configure to establish network communication over the network interface with an enrolment server on a public network using a network protocol and transmit to the enrollment server the activation code received from the computing device and the public encryption key from a public-private encryption key pair. The processing logic may also be configure to process data received from the enrolment server over the public network at the network interface hardware to derive therefrom connection parameters for establishing a connection with the security server provided in the data received from the enrolment server. The processing logic may also be configure to establish network communication over the network interface with the security server on a public network using a network protocol using the surveillance connection parameters received from the enrolment server and transmit to the security server security data encrypted using the connection parameters.

BRIEF DESCRIPTION OF THE DRAWINGS

The invention will be better understood by way of the following detailed description of embodiments of the invention with reference to the appended drawings, in which.

DETAILED DESCRIPTION

Herein description will be provided of particular examples and implementations, however this is for the purpose of providing the skilled person with the benefit of the invention, not to limit the invention. Modifications and variants upon the example provided are intended to be understood, particularly where appropriate, recognizable by a person skilled in the art or explicitly stated.

Figure 1:
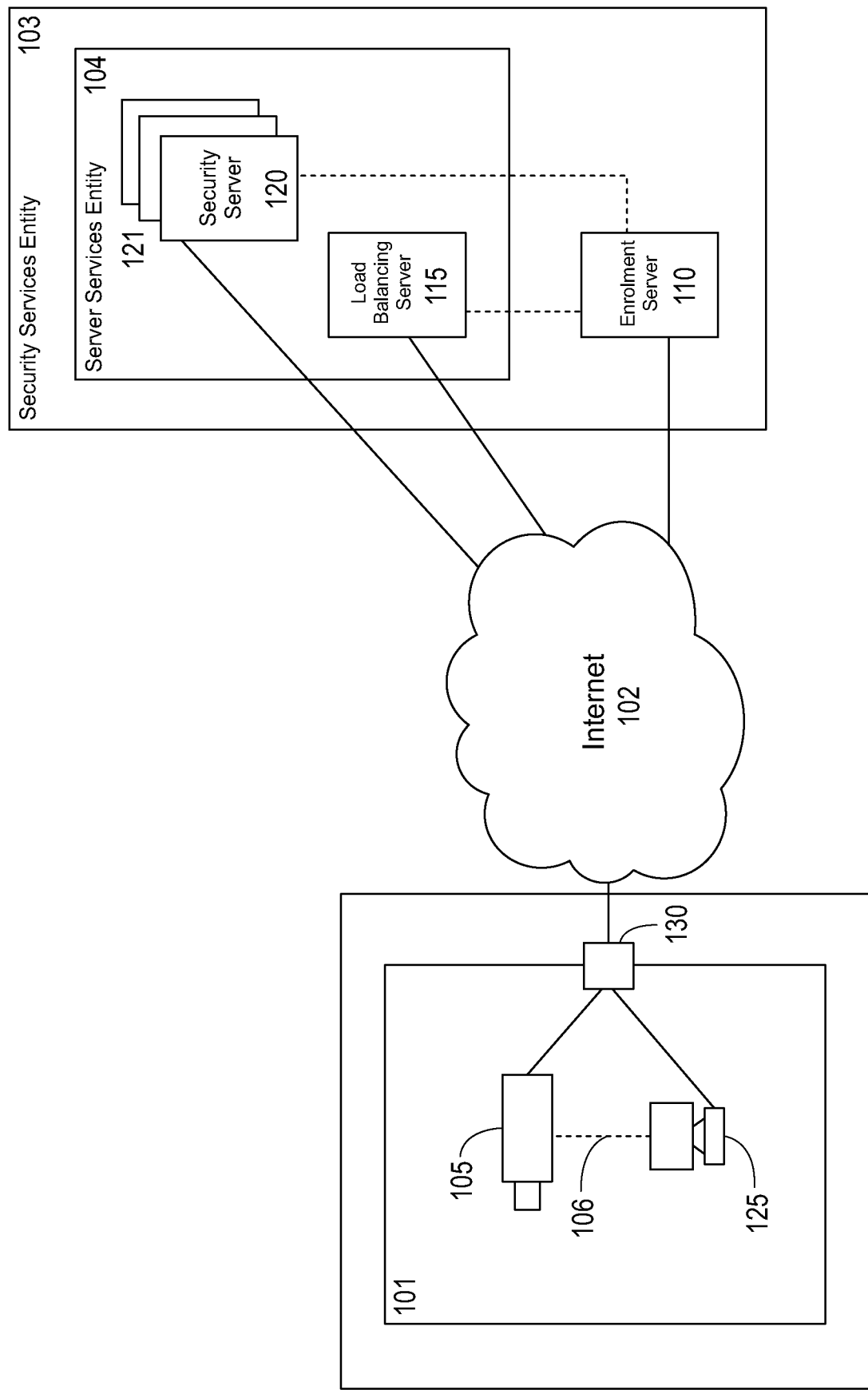
FIG. 1 shows a block diagram of a security system according to a particular example.

FIG. 1 shows a block diagram of a security system 100. The security system comprises a security device 105 at a customer premise and a computing device 125 which are in communication by a connection 106 which in this example is provided by a local network 101 which links the security device 105 and the computing device 125 through a router 130. The local network is connected to the internet 102, in this case by a connection to the router 130. The security system 100 also comprises a security services entity 103, here made up of several servers including an enrolment server 110. The security services entity 103 also comprises a server services entity 104 which in this case also comprises several servers, in particular a load balancing server 115 and one or more security server 120. In this case there are a plurality of security servers 120 which are shown here by the staggered boxes, however each server need not be in the same physical location but they may be scattered over the internet.

The security device 105 is a device that transmits security data to a security server for processing, e.g. storing. The security device 105 may comprise a security sensor for capturing security data. In the particular example shown here the security device 105 is a security camera that comprises a video sensor and an audio sensor. The security device 105 is a network-enabled device in that it is configured to communicate over a network using network a communication protocol to transmit the security data over the network. In particular, in this example the security device is an IP camera.

The computing device 125 is a network-enabled computing device capable of exchanging data over a data network and typically capable of running a web browser. For example, the computing device 125 may be a standard desktop or laptop computer. The computing device 125 may be in communication with the security device 105 via a connection 106. In some embodiments the security device 105 may have a serial bus connection such as a USB connection for communicating with the computing device however in this example, the connection 106 is a network connection and more particularly to this example it is a local network connection whereby the security device 105 and the computing device 125 are connected via the local network 101, e.g. through the router 130.

The local network 101 may of course comprise several routers and switches, FIG. 1 showing only a simple architecture for the sake of illustration. The local network 101 may be shielded from undesirable external connections by way of firewalls.

Figure 2:
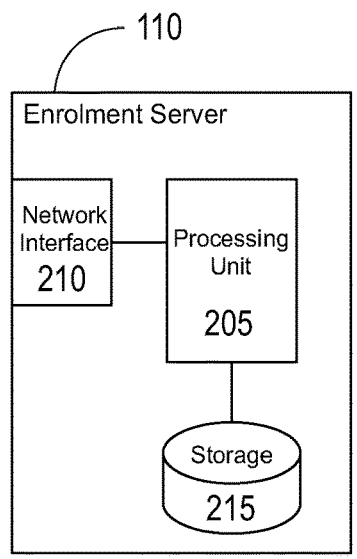
FIG. 2 shows a block diagram of an exemplary implementation of the enrolment server in the security system of FIG. 1.

FIG. 2 is a block diagram of an exemplary implementation of the enrolment server 110. The enrolment server 110 comprises network interface hardware 210 through which it communicates over the network, e.g. the Internet and through which it establishes connections with other network-enabled devices such as the security device 105, the computing device 125 and in this example the server services entity 104, e.g. the load balancing server 115. The enrolment server comprises a processing unit 205 that is in communication with the network interface hardware 210 and computer-readable storage comprising at least one memory unit that can be accesses by the processing unit 205. The processing logic of the enrolment server 110 in this example comprises at least one general-purpose processing unit that is configurable by programming whereby program instructions stored in a memory that instruct the general-purpose processor(s) to interact with, inter alia, the network interface hardware 210 to receive and transmit data over the network interface hardware 210 and also to process data, such as the data received over the network interface hardware. In this particular example, the enrolment server is a virtual machine created with a Microsoft™ Azure™ cloud platform which has a cloud-based processing unit is configured by being programmed as described by a skilled programmer. The program instructions in this example are stored on a tangible storage medium in storage 215. The storage 215 may also comprise memory for storing other data such as activation codes and indications of whether a particular security device has been authenticated.

In the present example, the enrolment server implements a web server and a REST API. In the present example, the enrolment server 110 has a known address that is used for all the security devices that may connect to the server services entity 104. Security devices of this example are configured at manufacture with the address, e.g. IP address, of the enrolment server 110 pre-configured in the firmware. Alternatively, the address may be provided separately, e.g. in the user manual or on the website of the company providing the enrolment server, and may be provided to the security device, e.g. using the computing device 125 via connection 106 for example as an input field in a web page provided by the security device 105.

Advantageously, enrolment services as provided herein are a light workload for the server and as such a single enrolment server can handle a very large number of devices, hence the single enrolment server for all security devices for the present example. That being said, in alternate embodiment there may be several enrolment servers functioning like the enrolment server 110. They may be distributed in any suitable manner, for example, each enrolment server may be dedicated to a subset of all security devices that may use the security services entity 103 (e.g. divided by groups of client with each enrolment server servicing one or more clients of the security services entity 103). Such division can be implemented by providing the manufactured cameras or their manual with different enrolment server addresses, for example. Alternatively the enrolment server workload may be distributed by a load balancing-like scheme where a single server with an addressed used by all devices distributes the workload among different servers. Regardless of whether one enrolment server or more are used, each enrolment server may be implemented in redundant copies or may have redundant storage to ensure data integrity in case of failure.

The server services entity 104 receives security data from the security device 105 and typically other security devices and processes it. In the present example, the server services entity 104 implements a security server 120 that stores the security data for future consultation. The security server 120 also provides other services and functions of a cloud-based security server, allowing authorised users to log on and review security data, e.g. video footage, manage data archival and alerts, etc. . . . . In some embodiments, the server services entity 104 may comprise a single security server 120, but in the present example, the security system 100 is large-scale scalable and comprises a bank of servers 121 suitable to implement the security server 120 and a load-balancing server 115.

The load balancing server 115 receives requests for transmission of security data to the security server 120. In some embodiments, the request for transmission of security data may take the form of an attempt to transmit the security data itself to the load-balancing server 115, resulting in a re-routing request from the load balancing server 115 towards the security server 120. In the present example, however, the security device is programmed to ascertain the address of the security server 120 by generating and transmitting an electronic request to the load balancing server 115 to provide it. The load balancing server performs suitable load balancing whereby it identifies the most appropriate server in the server bank 121 based on factors such as server workload, bandwidth, geographic location, link to a security account, etc. . . . . To this end the load balancing server 115 may be in communication (not shown) with the servers of the server bank 121 to assess their status or suitability for receiving security data. The load balancing server 115 then transmits to the security device 105 connection parameters for the security server 120 which will receive the security data from the security device 105.

In one particular embodiment, the connection established between the security device 105 and the security server is a secure connection, e.g. implemented by SSH or TLS as described further herein. To this end, the load balancing server 115 establishes the secure connection by providing secure connection parameters to the security device including in this example SSH parameters.

SSH and TLS are secure communication schemes; SSH being the precursor to TLS, which is used in the HTTPS protocol. SSH supports tunneling services whereby a single tunnel is used to pass through multiple services (SSH port forwarding). TLS does not support port forwarding but supports trusted certificate authority (CA) services, whereby a trusted service may be used to give the SSH session parameters to the security device.

TLS starts with asymmetric encryption to exchange symmetric key then toggle to symmetric encryption. With SSH, public key authentication may operate with the device being configured with a SSH username and a public/private key pair. The device's SSH username and public key may be added to an authentication list on the server. Once the SSH key exchange has been completed between the device and the server, the device sends a public-key authentication request containing, in one example, the SSH username, (the server may look up this username in its authentication list), the device's SSH public key (in this example, this public key is be the same as what the server has in its authentication list for that user), and a signature.

This signature proves to the server that the device knows the private key. The signature contains information known to both the server and the device, such as the session identifier that has been negotiated during the key exchange. The device encrypts the signature with its SSH private key. Upon reception, the server decrypts the signature with the public key it has on record for this SSH user, and if it finds the expected decrypted information in the signature, the identity of the device is proven.

In this example, the security server connection parameters provided to the security device 105 by the load balancing server 115 are secondary connection parameters, forming the second part of connection parameters, the primary connection parameters being the connection parameters provided by the enrolment server 110 which enabled the security device 105 to establish a connection with the load balancing server 115 in the first place.

Once a connection is established between the security device 105 and the security server 120, the security device 105 begins secure transmission of security data.

Figure 3A:
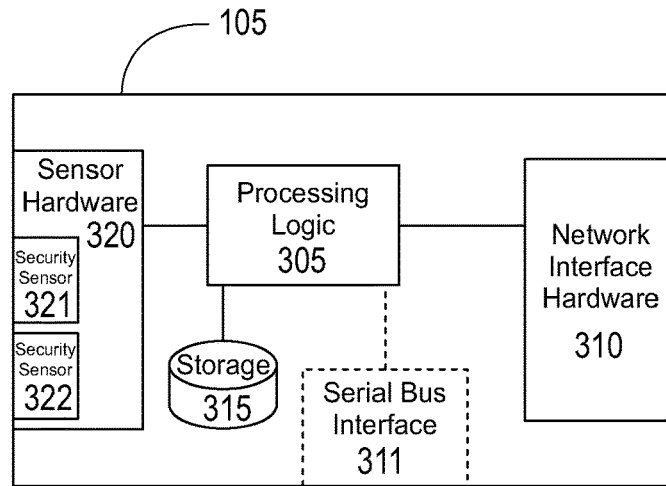
FIG. 3A shows a block diagram of an exemplary implementation of the security device in the security system of FIG. 1.

FIG. 3A is a block diagram of the security device 105 according to the present example. The security device 105 of this example is an IP camera that has security sensing hardware 320 which comprise in this example several security sensors 321, 322, in this example a video sensor and an audio sensor. The security device is network-enabled and comprises network interface hardware 310, which in this example comprises an Ethernet interface for communicating over an IP network. The security device 105 may also comprise a separate serial bus interface 311 such as a USB interface for communicating with the computing device 125 although in this example the security device communicates with the computing device 125 over the network interface 310. The security device 105 comprises a processing unit 305 that is in communication with the sensor hardware 320 and the network interface hardware 310, and optionally the serial bus interface 311, and computer-readable storage 315 comprising at least one memory unit that can be accessed by the processing unit 305. The processing logic of the security device 105 in this example comprises at least one general-purpose processing unit that is configurable by programming whereby program instructions stored in a memory that instruct the general-purpose processor(s) to exchange data between the component parts of the security device and to process data. In particular, the processing logic 320 may receive from the sensor hardware 320 security data which it may process (e.g. encode, encrypt etc. . . . ). The processing logic is configured to interact with the network interface hardware 310 (and optionally the serial bus interface 311) as described herein by being so programmed by a skilled programmer. The program instructions in this example are stored on a tangible storage medium in storage 315. The storage 315 may also comprise memory for storing other data such as an activation code, web page data, etc. . . .

Figure 4:
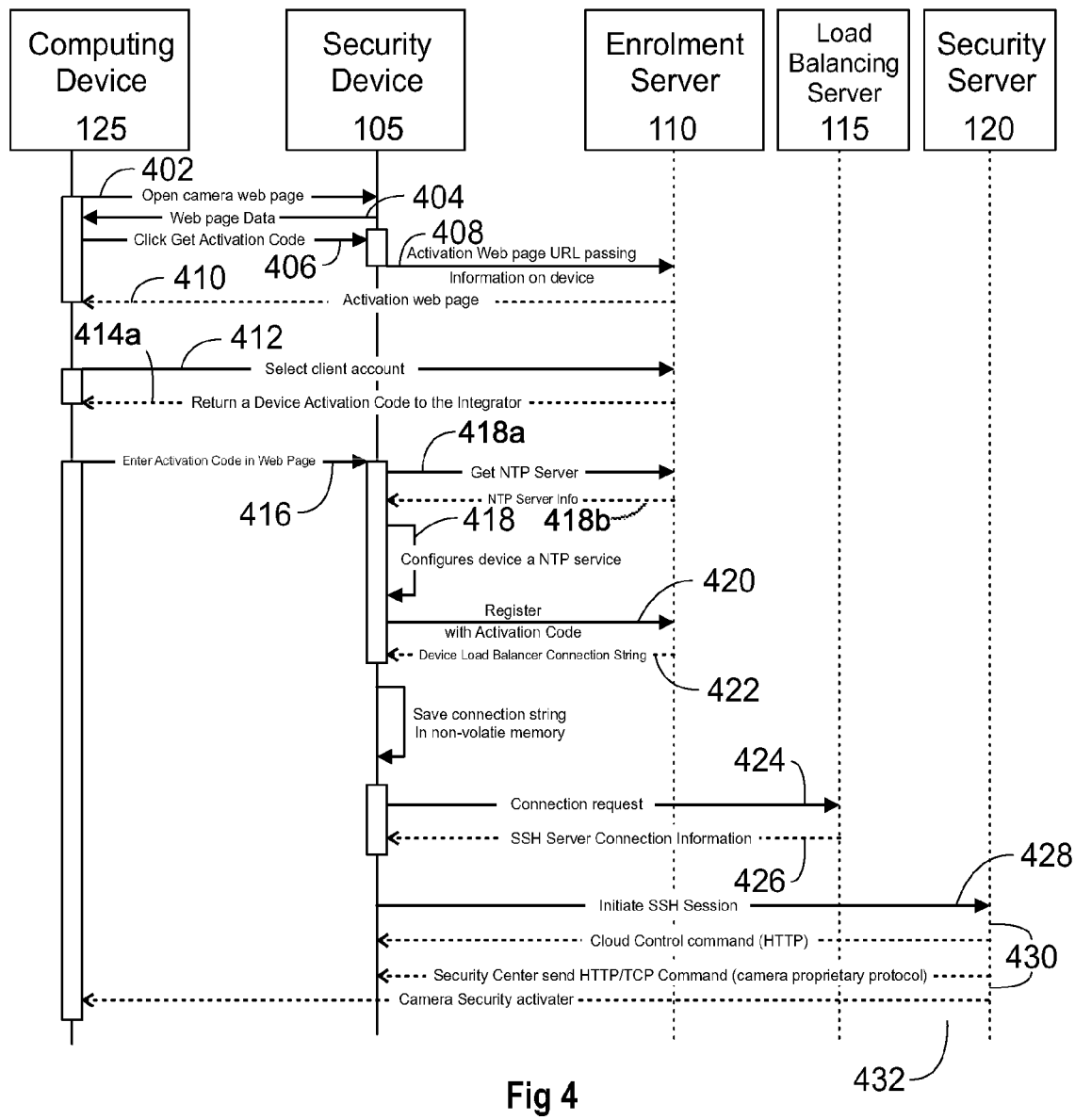
FIG. 4 shows an event flow diagram showing interactions between the elements of the system of FIG. 1 according with a particular example.

FIG. 4 is an event flow diagram showing interactions between the computing device 125, security device 105, enrolment server 110, load balancing server 115 and security server 120 in accordance with the present example.

In the present example, the computing device 125 begins by communicating with the security device 105. In particular, the security device 105 is connected to the local network 101, and the computing device communicates with it, e.g. by providing its IP address in a web browser. The security device 105 implements a web server for the computing device 125 such that the computing device 125 can access and open a web page by a properly formulated request 402.

The security device 105 establishes a data connection with the computing device 125, and vice versa. In this example, this is done in response to prompting from the computing device. The security device 105 transmits to the computing device 125 over the connection enrolment connection parameters with which to provide the computing device 125 network communication with the enrolment server 110. Here, the security device retrieve web page data and transmit it 404 to the computing device. In this example, the web page is displayed on a web browser to a user, e.g. an integrator/administrator at the computing device.

Figure 5:
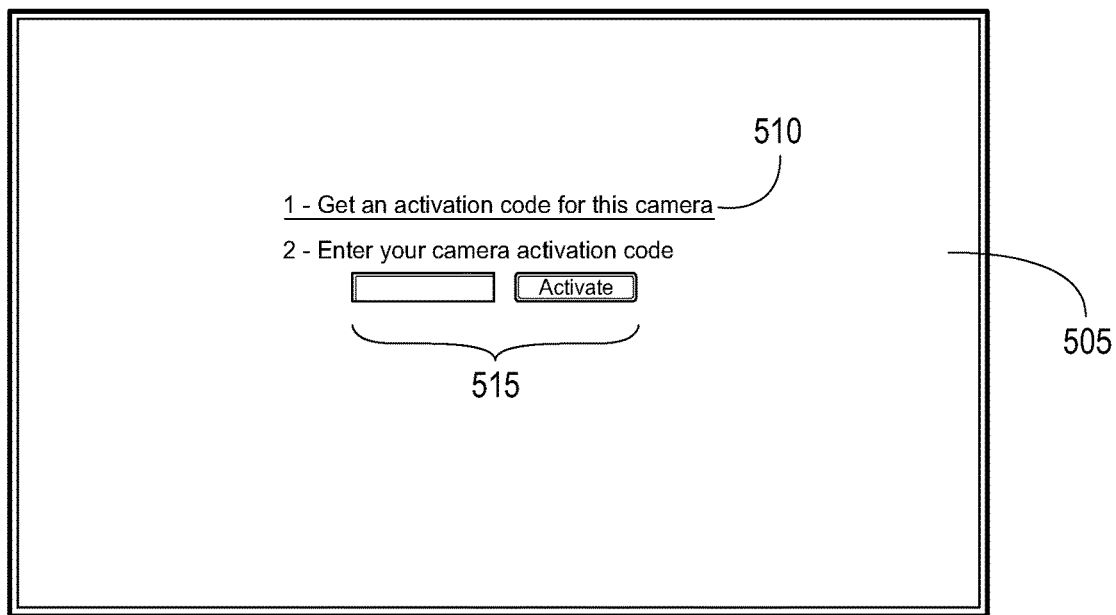
FIG. 5 shows an example of the enrolment web page provided by the security device of FIG. 3A and displayed at the computing device.

FIG. 5 shows an example of the enrolment web page 505 provided by the security device 105 and displayed at the computing device 125. As shown the web page includes a "get activation code" button 510, clicking on which results in a corresponding message being transmitted by the computing device 125 to the security device 105.

The computer device 125 establishes network communication with the enrolment server 110, which in this example also implements a web server such that the computing device may access the enrolment server using a web browser. The computer device receives enrolment connection parameters from the security device 105, e.g. including an IP address or URL, with which to communicate with the enrolment server 110. In this example, the security device 105 participates to the establishment of the communication between the computing device 125 and the enrolment server. Specifically, upon receiving an indication of request for an activation code 406, in this example based on the detection of a click on the "get activation code" button, the security device 105, establishes communication with the enrolment server by accessing 408 an activation web page URL which prompts the enrolment server 110 to respond by returning the activation web page 410 to the computing device 125. This can be done in several manners, e.g. through a separate browser window opened at the computing device 125. Alternatively widgets or other solutions may be used.

It should be noted here that in this example the security device 105 comes pre-loaded with the enrolment server 110's address (e.g. URL). This is provided in the device's firmware, just like the device's web page data that it provides to the computing device 125. In other embodiments, however, the security device 105 may contact another known server to obtain the enrolment server 110's connection parameters. Alternatively still the computing device 125 may establish communication with the enrolment server 110 without going through the security device 105, for example the URL of the activation web page may be provided in the security device 105's user manual or on a company web page.

Now the computing device 125 establishes a connection with the enrolment server 110, and vice versa, and in this case it receives the device activation web page from the enrolment server 110. The connection with the enrolment server may be a secure one using HTTPS.

Figure 6:
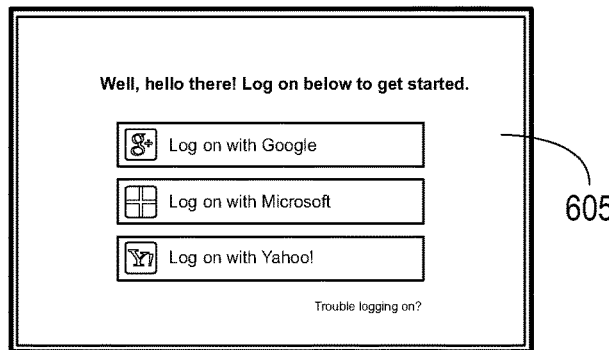
FIG. 6 shows an exemplary log on screen provided by the security device via which a user may be authenticated, e.g. with user credentials, for the exemplary purpose of registering a security device in the system and linking it to a security account.

As shown in FIG. 6, a log on screen 605 is provided by the web page. In response to the log on screen, a user at the computing device 125, enters authentication data, such as a username and password. This authentication data is transmitted over the network connection from the computing device 125 to the enrolment server 110 where it is received. The enrolment server authenticates the connection with the computing device 125 on the basis of the authentication data to establish that the connection is with an authorized entity. For example, the enrolment server may receive from the computing device 125 a username and password (e.g. encrypted with HTTPS) which it may verify against a database of approved usernames and passwords. Authentication of the connection may be based on the identification of a matching username and password in the database. The enrolment server 110 may also obtain other information based on the authentication data, e.g. a list of accounts, other security devices, and other details.

Figure 7:
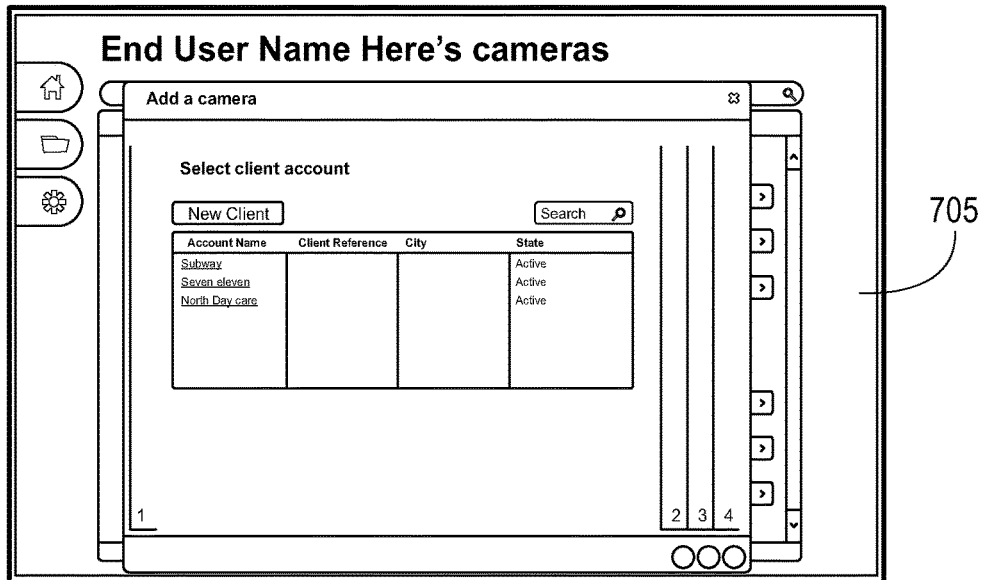
FIG. 7 shows an exemplary account prompt provided in a web page by the enrolment server of FIG. 2.

In the present example, the enrolment server identifies the security accounts associated with the user and provides a prompt 705, shown in FIG. 7 to select an account to which to add the security device 105. Using typical web interface, a user at the computing device 125 may make a selection and the computing device returns a selection 412.

Upon successful authentication of the connection/computing device 125/user, and upon further step, if present, such as the account selection and/or selection of a camera manufacturer and model, the enrolment server 110 transmits 414a an activation code 414 to the computing device 125. Advantageously, the enrolment server 110 now knows that it is in communication with a computing device and that the connection, which further advantageously is secured by encryption in this example, has been authenticated. Therefore there is confidence that the activation code is provided to an authorized entity and to no other.

The enrolment server 110 associates the activation code 414 with the particular device to register. In this example the enrolment server stores in storage 215 an association of the activation code with a device to register. If details on the device are known the enrolment server 110 may also associate them with the activation code in the storage 215. In this example, details such as the serial number, make, model, IP address, and/or MAC address are provided, either by the security device 105 itself when requesting the activation web page for the computing device 125 from the enrolment server 110, for example using REST API. However, in other embodiments, the computing device may provide these details, e.g. if the activation web page includes a form for providing such data.

Figure 8:
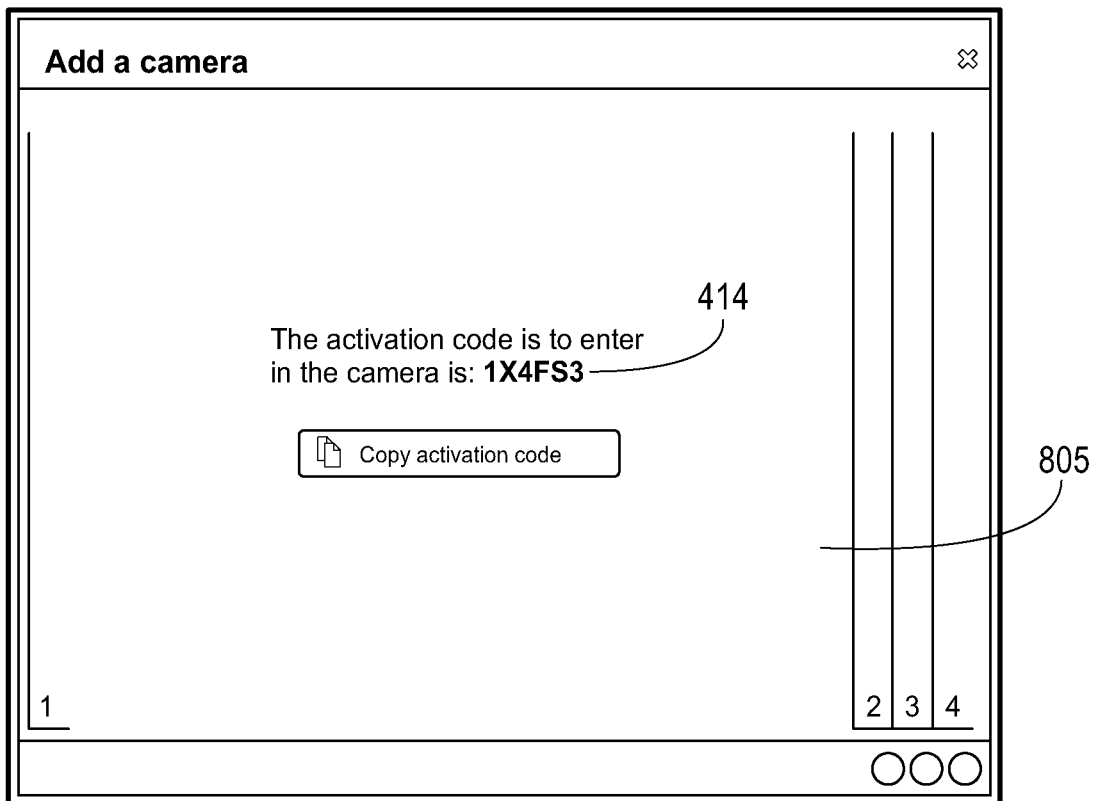
FIG. 8 shows an exemplary web page providing an activation code provided by the enrolment server of FIG. 2.

Once the activation code 414 is received at the computing device 125, it is provided to the security device via the connection between the security device 125 and the enrolment server 110, e.g. displayed on the web page 805 as shown in FIG. 8.

Figure 9:
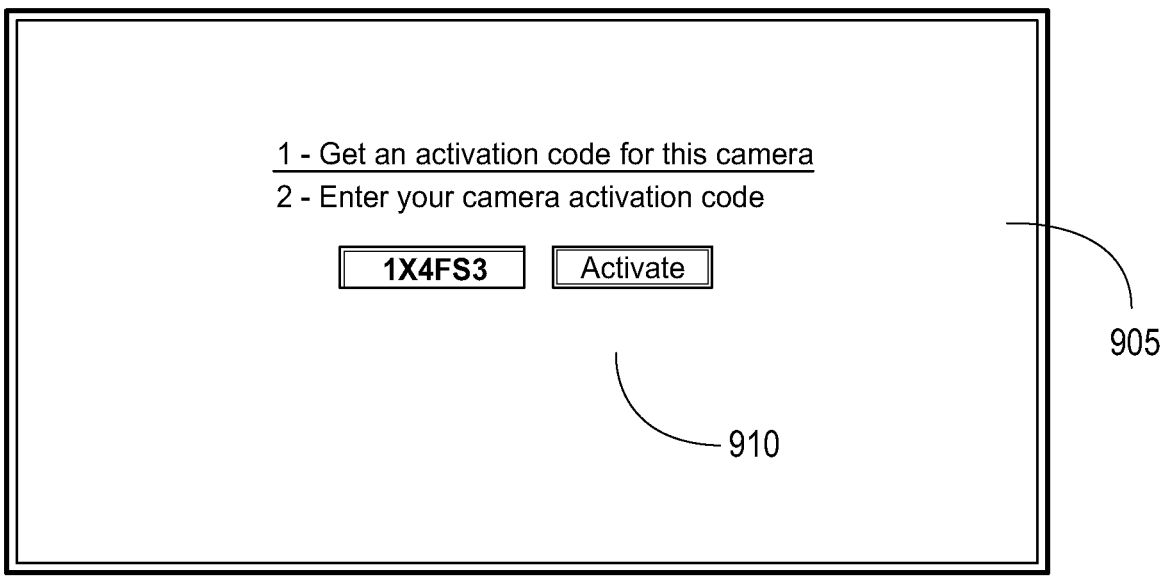
FIG. 9 shows an exemplary web page providing an input interface for providing the activation code to the security device of FIG. 3A.

Now the activation code 414 is provided by to the security device 105 in a secure or closed manner. In the present example, this is done via the connection established between the computing device 125 and the security device 105. In particular, the security device 105 acting as a web server to the computing device 125 provides a web page 905, shown in FIG. 9 having a form 910 in which the activation code can be provided resulting in the transmission 416 by the computing device 125 of the activation code 414 which is then received at the security device 105. In this example where a web interface is used, the input of a user at the computing device is used, however this user is the same user at the same computing device 125 here that authenticated himself with the enrolment server. In an alternative embodiment, the computing device may provide the activation code 414 received from the enrolment server 110 automatically without user intervention.

Once the security device 105 has the activation code 414, it may then register itself without human intervention with the enrolment server 110. It may begin as it does in this example with certain formality communications 418a, 418b, e.g. to configure NTP server settings 418. The security device 105 establishes communication, if not already done, with the enrolment server 110 and vice versa and communicates data, e.g. using REST API. The connection between the security device 105 and the enrolment server 110 may be a secure connection, e.g. encrypted using HTTPS.

Over the connection, between the security device 105 and the enrolment server 110, the security device transmits to the enrolment server the activation code 414 as wells as device data, such as identification data if not already done. In the communication exchange between the enrolment server 110 and the security device 105, device identification data (e.g. MAC address, serial number, public key) is exchanged that allows, once the security device 105 is authenticated, identification of the security device 105 as a device that has been authenticated. In the present example, the public key of the security device 105 is used. In particular, the security device 105 transmits the activation code 414 along with its own public key 420 of a public-private encryption key pair to the enrolment server.

The enrolment server 110 receives the activation code 414 and the public key 420 of the security device 105 and authenticates the device on the basis of at least the activation code 414, in this example by verifying that the activation code received from the security device 105 matches the activation code transmitted to the computing device 125. The enrolment server 110 could simply verify that the activation code 414 is a code that has been transmitted by the enrolment server 110, however in this particular example the enrolment server verifies other constraints, including whether the security device 105 from which it originates matches the device information (e.g. MAC address, IP address, model, make and/or serial number) associated with the activation code. It also verifies whether the activation code is (e.g. still) valid based on certain constraints e.g. as described in more details below.

Upon finding the constraints met and the activation code valid, the enrolment server 110 creates in a computer-readable memory a consultable indication that the security device 105 has been authenticated. In the present example, the enrolment server 110 stores the public key 420 of the security device 105 in a stored list of authenticated public keys, in this case alongside other information related to the security device 105 such as the security account to which it is associated. Henceforth when verification is needed of whether the security device 105 is authenticated, e.g. when the security device 105 attempts to establish a connection with the server services entity 104 (e.g. the load balancing server 115 or the security server 120), the device identification data, in this case its public key 420 may be used to consult the consultable indication to determine that the security device 105 is authenticated. To this end, the security device 105 may provide with requests that require authentication the device identification data, or in this particular case, the security device 105 signs its request with its private key, allowing verification of the signature with the public key 420 which the consultable indication may comprise.

The consultable indication of this example is stored by the enrolment server 110 locally in the storage 215. Future verifications that the security device 105 has been authenticated may be done by other entities, e.g. by the server services entity 104 such as by the load balancing server 115 or the security server 120. Therefore, additionally, or alternatively to storing it locally, the enrolment server 110 may create the consultable indication in the memory of such other entity(ies) by transmitting the consultable indication, or part thereof, to the other entity(ies).

Now in the present example, the activation code 414 is a single-use activation code, that is to say a code that is intended for activating a single security device only once. In particular, in this example, the activation code 414 is generated by the enrolment server 110, e.g. using a pseudorandom number generator, though it could also be taken, e.g., from a non-predictable nonrepeating sequence of codes. Upon generation, or selection, of the activation code 414 the enrolment server associates it with the security device 105. The enrolment server 110 enforces single-use of the activation code by verifying, upon receipt of the activation code 414 from the security device 105, that it has not been used before. In one example, the enforcement server 110 may store an indication in association with each activation code that it has been used once. In this example, however, where the activation code is generated for a single use, the enrolment server 110 simply deletes the activation code 414 from its storage 215 after it has been used to authenticate the security device 105 such that if the security device 105 or another security device attempts to register itself using the same code in the future, verifying a match for the activation code 414 will fail.

In addition, in the present example the activation code 414 is subject to additional constraints in that it is only valid for a particular period of time. In particular it is subject to time constraints. Verification that the activation code 414 matches the activation code transmitted to the computing device 125 comprises verifying whether the activation code 414 created and/or transmitted to the computing device 125 within a maximum time period. In some embodiments, this may be implemented by storing a timestamps alongside the activation code 414, however in the present embodiment, the activation code 414 is simply deleted upon expiration of the maximum time period such that attempting to authenticate the security device 105 after the maximum time period has lapsed will fail. To this end, a timestamp may still be created and stored and the activation code storage may be monitored by a procedure that deletes old activation codes based on their timestamps.

The time period may be static, or in alternate embodiments, it may be based on other things such as transactions. For example, the code may be considered valid for such a time as that no other activation code has been requested, e.g. for that particular security services account. Once a new device activation is attempted, requiring a new code, any previously-unused code may be considered expired. This single-code-at-a-time constraint may be set as an additional or alternate constraint to the maximum time period described above.

Once the device has been authenticated, verification of the authentication may take place as needed, in this example by verifying that transmissions from the security device 105 (in particular in some example, transmissions of security data such as video footage, but also in other examples transmissions of requests to register on the security server 120 or other transmissions) are signed by a private key corresponding to the public key 420 that was provided along with the activation code 414 during authentication.

Returning to the example of FIG. 4, upon successful authentication of the security device 105, the enrolment server 110 transmits to the security device 105 over the connection therewith connection parameters for establishing a connection with the security server 120. In some embodiments, connection parameters may be pre-programmed in the security device or may be provided externally, e.g. by a user or by the computing device 125. However in this example, the enrolment server transmits to the security device 105 connection parameters which in this case provide parameters for communicating with the load balancing server 115, e.g. in the form of a device load balancer connection string 422 (e.g. URL) which is then stored in the device storage 315. In some examples, the connection parameters may be used by the security device 105 as proof that the device 105 has been authenticated, e.g. if the connection parameters are secret or if the enrolment server 110 generates and provides in the connection parameters evidentiary data, e.g. passcode or key which may be signed with a private key to which the intended checker (e.g. load balancing server 115 or security server 120) know the public key, as proof that the security device 105 has been authenticated. However in this example the proof is in the signature of data by the security device and certification by the enrolment authority of the corresponding public key 420.

With the connection parameters obtained from the enrolment server 110, the security device 105 establishes network communication with the surveillance server 120. In this case, the security device 105 first establishes a connection with the load balancing server 115 using the parameters received from the enrolment server 110 and transmits to the load balancing server 115 a connection request 424.

The load balancing server provides the security device with additional (secondary) connection parameters this time for connecting to the particular security server 120 that has been selected by the load balancing server 115 for the security device 105. In this example the eventual connection between the security device 105 and the security server 120 is an SSH connection and the load balancing server provides to the security device 105 the SSH connection parameters 426 required for the connection. The secondary connection parameters may also include, e.g. an address of the security server 120. Here too the connection between the security device 105 and the load balancing server 115 may be a secure connection, e.g. using HTTPS. Finally, using the secondary connection parameters, the security device establishes a connection with the security server, in this case initiating 428 an SSH session. In particular in this example, the device sends a public-key authentication request containing: an SSH username (the server will look up this username in its authentication list), the device's SSH public key (this public key must be the same as what the server has in its authentication list for that user), and a signature. This signature proves to the server that the device knows the private key. The signature contains information known to both the server and the device, such as the session identifier that has been negotiated during the key exchange. The device encrypts the signature with its SSH private key. Upon reception, the server decrypts the signature with the public key it has on record for this SSH user, and if it finds the expected decrypted information in the signature, the identity of the device is proven. TLS, of course, may also be used instead. In response, the security server 120 provides 430 to the security device 105 control information, e.g. to be used in data transfers between the two.

Once the security device 105 is duly registered on the security server 120, the security server 120 may establish communication 432 with the computing device 125, if this is not already done, and transmit thereto a confirmation that the security device 120 has been registered, e.g. to be displayed to a used at the computer 125.

Security data is transmitted to the security server 120 by the security device 105 in security data transmissions that are verified thanks to consultation of the consultable indication created by the enrolment server 110. A consultation may serve to verify future security data transmissions. For example, the connection request to the load-balancing server 115 may prompt verification of authentication by the load balancing server 115 and/or registration with the security server 120 may prompt verification by the security server 120 of authentication by the security server 120.

Verification by other entities such as the server services entity 104 or servers therein may be done by way of communication between such entity and the enrolment server 110. In some embodiments, a trusted relationship and secure connection exists between these entities such that one server can securely request consultation of the consultable indication of device validation stored at another. In one embodiment, however the consultable indication, or at least a portion thereof, is transmitted from the enrolment server to another server using it. For example the security server 120 may, during registration of the security device 105, consult the consultable indication at the enrolment server by requesting the public key 414 corresponding to particular security device 105 parameters received from the security device 105 or from the load balancing server 115 (which may communicate them to the security server 120 upon assigning it to the security device 105). In response, the enrolment server 110 may consult the consultable indication and retrieve the public key 414 and provide it to the security server 120. The registration request or other security transmission including transmission of security data such as video footage to the security server 120 from the security device 105 may be signed with the corresponding private key making verification of the transmission's signature sufficient to establish that the security device 105 is authenticated and future transmissions, e.g. under the SSH session may be unsigned.

Likewise the load-balancing server 115 may require authentication instead of, or in addition to, the security server 120. This may be implemented similarly to the above description in respect of the security server, whereby the connection request may, for example, be signed with the private key of the security device 105.

Alternatively, however, as mentioned above the consultable indication of device authentication may be stored at another entity such as the server services entity, e.g. the load balancing server 115 and/or the security server 120 such that consulting the consultable is done on site by those entities.

Thus the duly registered security device 105 may now transmit securely security data to the security server without risk of the wrong device being used.

The consultable indication of authentication may be time-limited, e.g. using techniques described above in relation to the activation code 414, and the security server 120 may require periodic reverification of the authentication. For example, the security server 120, upon performing a verification with the enrolment server 110, store the public key 414 of the security device 105 in a cache so as to not overburden the enrolment server 110, particularly if every data transmission from the security device is signed with the device's private key. The cache may be provided with an expiration period to keep "fresh" and ensure that if authorization for the device is withdrawn at the enrolment server, the security server 120 discovers this soon.

Many variations on the above example are possible, for example the load balancing server 115 may be absent, or its function may be merged with the enrolment server 110 such that the enrolment server performs both authentication and load balancing. Alternatively, e.g. in a smaller-scale environment, a single server may be sued where the enrolment server is also the security server and authenticates, registers and receives security data from the security device 105.

Figure 3B:
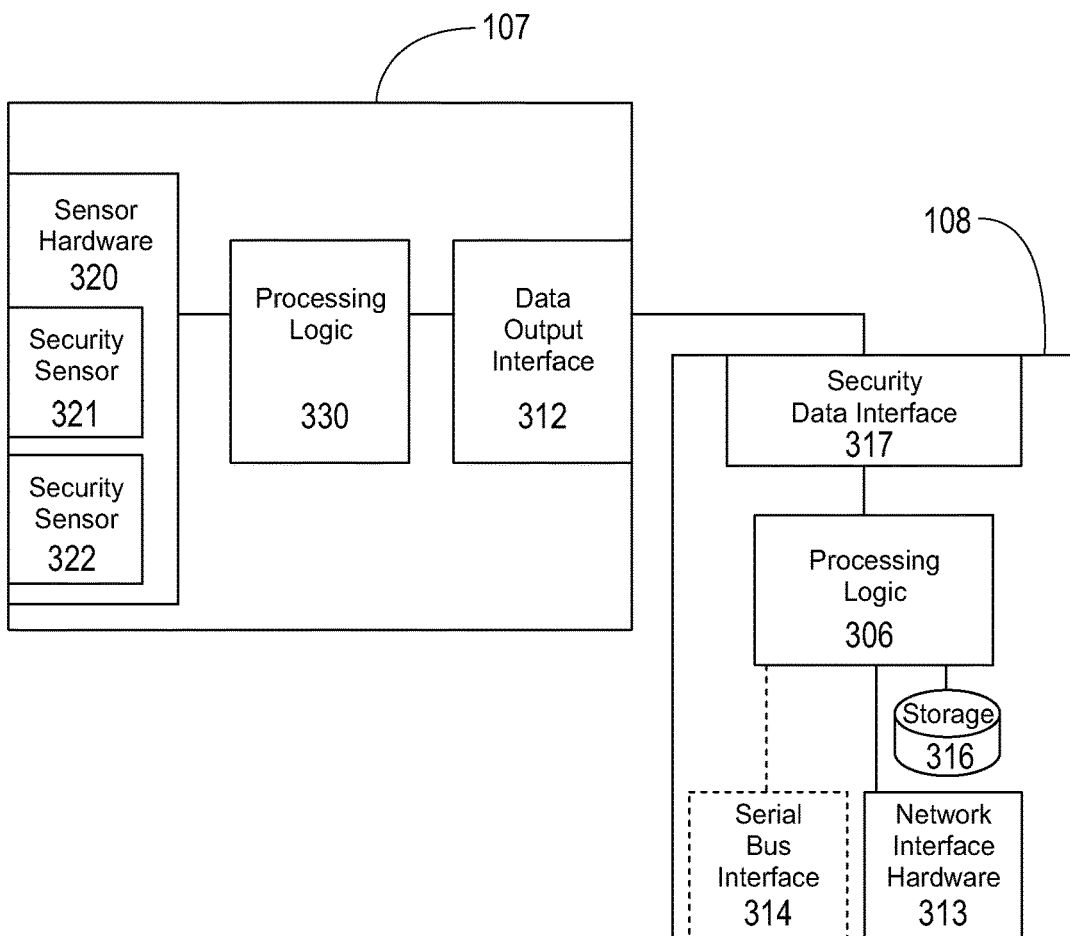
FIG. 3B shows a block diagram of another exemplary implementation of a security device.

In one alternative example illustrated in FIG. 3B, a security device may not be outfitted with the suitable functionality to embody the techniques and structure described above. For example, the security device may be a simple security camera that does not have the required logic. For example the security device is a security camera 107 that has simple processing logic 330 to merely encode and transmit video and audio data over a data output interface 312 that may not be a network interface. In such an example, the security device may be provided as a separate unit 108 connected to the camera 107 (or other security data generation/transmission device) to enable authentication in the manner describe above. In particular the unit 108 has a security data interface 317 to receive the security data (e.g. video feed) from the camera 107, and network interface hardware 313 that may be similar to the network interface hardware of the security device 105. Like the security device 105 of FIG. 3A, the unit 108 may optionally also have a separate serial bus interface 314 for communicating with the computing device 125, but in this example the communication with the computing device 125 is through the local network 101 as described with respect to the security device 105. The processing logic 306 and storage 316 of the unit 108 is similar to the processing logic 305 and storage 315 of the security device in that it may be structured in the same manner and perform the same function such that the unit 108 may provide to an otherwise-incapable device the ability to embody the herein described technology. The unit 108 may have its own private-public encryption key pair to be used as with the security device 105.

Although in the above example the security device 105 and camera 107 were cameras, other security devices that may be used in a security system 100, particularly a cloud-based security system may be configured as described. For example, a diverse security system may comprise door sensors, motion detectors, smoke or other gas sensors/detectors, microphones, access control devices, access card readers, door locks, and other sensors that may each be generating and/or transmitting security data to a security server 120 over a public network. Each such device may be configured and operate as described with respect to registration and/or security data transmission.

In order to better illustrate the technology provided, implementation details of one particular exemplary embodiment will now be described. For the following description of this particular example the following terms may be used as follows:

Device: Network appliance that exposes a network API over TCP or HTTP. The device may be an IP camera or an IP encoder for the CBVSS. In one alternate embodiment, a device is a camera gateway for the CBVSS that provides CBVSS access to a camera not configured to operate on/with the CBVSS. The camera gateway may perform as the device by providing a legacy interface to the camera and performing as described herein.

SSP instance: CBVSS may comprise multiple instances of SSP rolled out in different datacenters around the world. Each instance of SSP may have an SSH Tunneling Server.

SSH Tunneling Server: components used to securely interconnect a device with CBVSS over the internet by allowing to encapsulate/tunnel any protocols based on TCP. Each SSP instance may have its own Tunneling server pool.

Device Load Balancer: Module inside a SSP instance responsible to assign a device to appropriate instance of SSH Tunneling Server based on availability and load of the system.

Enrolment Service: Cloud service developed and managed by the CBVSS manager to dispatch CBVSS capable devices to the appropriate SSP instance.

Device Unique ID: String that uniquely identifies a device for a manufacturer, the device ID may be used at different places in the protocol. Typically, the Device Unique ID remains constant for a given device, regardless of the firmware version. It may be the MAC address of the device without the separating hyphen "-" or colon ":" in between each byte.

Device Activation Code: Code generated by CBVSS that the user enters in the device web page to enroll it in the CBVSS. That activation code is a shared secret key used by the device to push its own SSH public key to the service. In this example, an activation code can be only used once and is only required for new devices or after a factory reset. It may be composed of 7 alphanumeric characters: Ex: XA21F3G SSH Device Private Key: RSA 2048 bits encryption key that is used to sign messages when communicating with the CBVSS. That private key must be unique per device. In this example it does not change after a firmware upgrade. But it can be overwritten after a factory reset.

SSH Device Public Key: RSA 2048 bits encryption key that is used by the CBVSS to authenticate the device. The public key must be unique per device and match the private key. It must not change after a firmware upgrade. But it can be overwritten after a factory reset.

SSH Server Private Key: RSA 2048 bits encryption key used by the Tunneling Server to sign messages that are sent to the devices. That private key may be unique to a single SSP instance in the cloud.

SSH Server Public Key: RSA 2048 bits encryption key that is used to authenticate the SSH Tunneling server that signs message with its private key.

CBVSS Cloud Control protocol: A set of HTTP Requests that are implemented in the device firmware to allow the CBVSS to control some cloud specific functionalities like load balancing or removing a device from the CBVSS.

Device activation page: A page hosted in the device web server to initiate the enrolment of a device in the CBVSS.

Account Name: String provided to the device manufacturer to identify itself. One or multiple accounts can be provided.

Provided in this example is a cloud based video surveillance system (CBVSS) that can record and playback IP devices over the Internet. Instead of being centralized in one datacenter the system is distributed around the world in different datacenters but it's totally transparent to the end user. The system's distributed architecture offers transparent geo-redundancy and also minimizes the latency of video streams.

The system comprises one or more instances of a security software platform (SSP) that can transparently link and manage security devices over the cloud. When a device is enrolled in the system, the device is provisioned on the best security software platform based on availability and end-user location.

The cloud based video surveillance system is designed to address small and medium business by simplifying and reducing installation and operation costs. An integrator does not have to have extensive IT and IP network skills. The enrolment of a device under the system is simple and does not require any firewall configuration.

Reusing the security software platform in the background allows the system to leverage any devices and features already integrated for the platform when used in the cloud. The protocol is able to adapt to any proprietary protocol without requiring to be modified each time a new functionality is added to a device.

The connection between the cloud based video surveillance system and the device is secure thus fulfilling the needs of end users concerned with privacy who expect the video to be securely transmitted. Also, the protocol provides strong authentication mechanism that prevents malicious people from corrupting or taking down the service.

An exemplary customer for the system may require simple use and provisioning of the system. Device manufacturer requires a simple way to communicate with the CBVSS that can be easily integrated and does not require continuous maintenance.

The CBVSS will now be described:

Adding a camera to the CBVSS:

In the CBVSS ecosystem, the integrator is responsible to enroll devices and assign them to the appropriate customer account in the CBVSS.

The enrolment in this example is simple and does not require to have a fixed public IP address or configure inbound ports on a firewall.

Figure 10:
FIG. 10 shows an exemplary web page confirming that the registration is complete provided by the security device of FIG. 3A.

The following are exemplary steps to add a camera in the CBVSS:

1. Integrator configures IP Settings and DNS servers using device manufacturer's recommendations. Most of the time through the device web interface or an installation wizard tool.
2. Integrator opens the device's web page to http://<device ip address>/CBVSS (as shown in FIG. 5).
3. Integrator clicks on "Get an activation code" and a new tab opens with the CBVSS enrolment pages
4. Integrator authenticates to the CBVSS if not already authenticated (see FIG. 6).
5. Integrator selects a customer account to which he wants to add the device (see FIG. 7).
6. The CBVSS generates a unique activation code that is valid for one activation only with this device (see FIG. 8).
7. Integrators enter the activation code in the device web page and click activate (see 515 at FIG. 5 and FIG. 9).
8. Device connects to the CBVSS and the integrator can configure recording and quality settings in the CBVSS web interface (see FIG. 10).

CBVSS Cloud Architecture:

Although this may be transparent to users, the CBVSS may be a geo-distributed system running across multiple datacenters around the world. For example, when a customer in Chicago creates an account, the video may automatically be recorded in a US datacenter, the same may be the case in Europe if the customer is located in Madrid.

Figure 11:
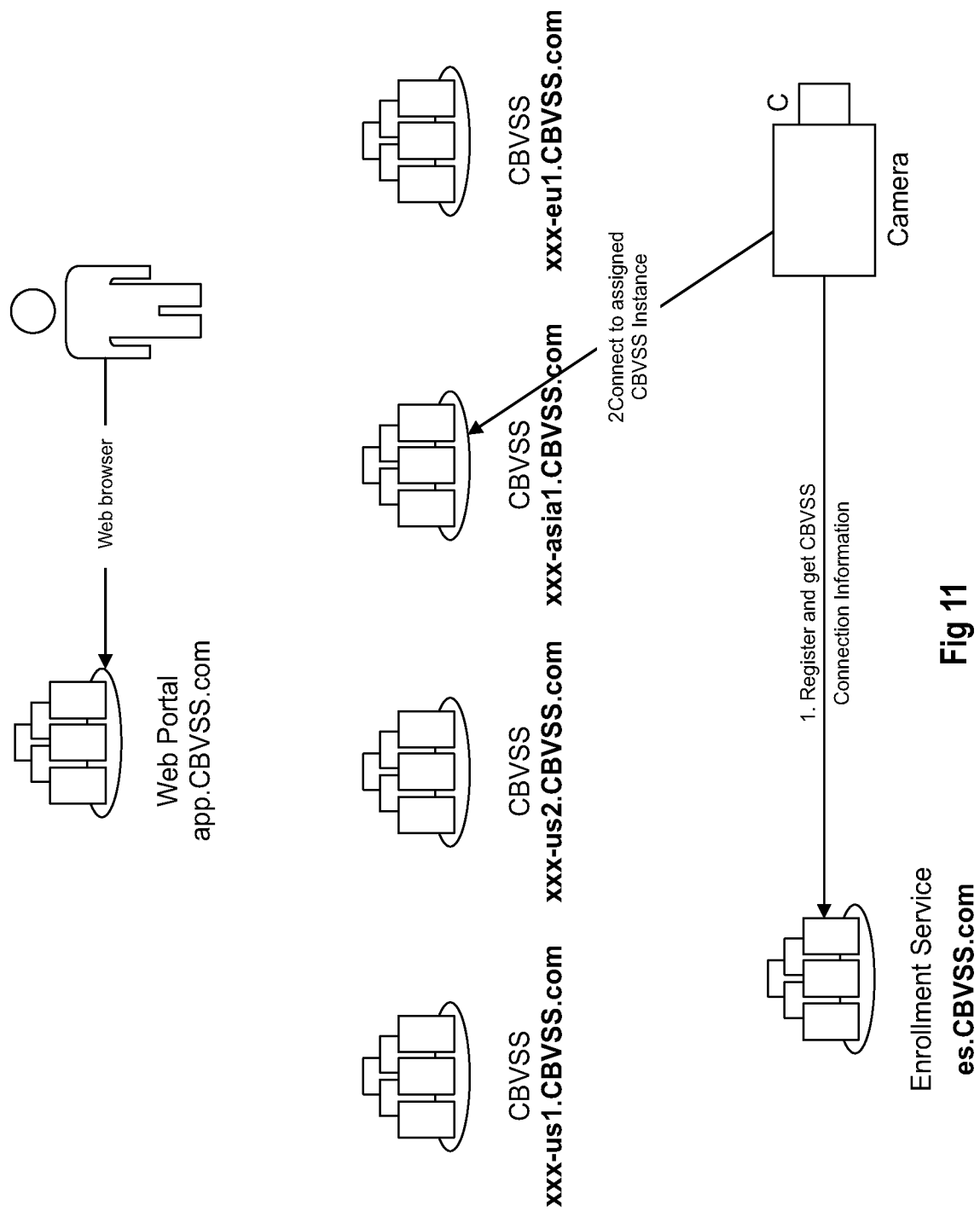
FIG. 11 is a block diagram illustrating the relationship between security server, enrolment service and camera according to a particular example of implementation.

In the background, the CBVSS may comprise multiple instances of SSP deployed everywhere with extra modules required to securely communicate over the internet (in alternate examples, the instances of SSP may be considered external to the CBVSS and may be in communication therewith). In this example, only the web portal (e.g. es.CBVSS.com and the enrolment service for device registration have a fixed DNS name, the rest being dynamic with the number of system deployed). FIG. 11 illustrates the relationship between the security server, enrolment service and camera.

During the enrolment process of a camera, the system will automatically determine which instance of SSP will be responsible for the newly added camera.

CBVSS Protocol Description:

The CBVSS protocol comprises several services with the objective to create a secure connection between the camera and server responsible to record and control this camera. The CBVSS protocol does not, in this example, define how the SSP requests video. The implementation of the CBVSS protocol supports existing protocols and it is designed to allow any camera to communicate over TCP with the SSP.

Figure 12:
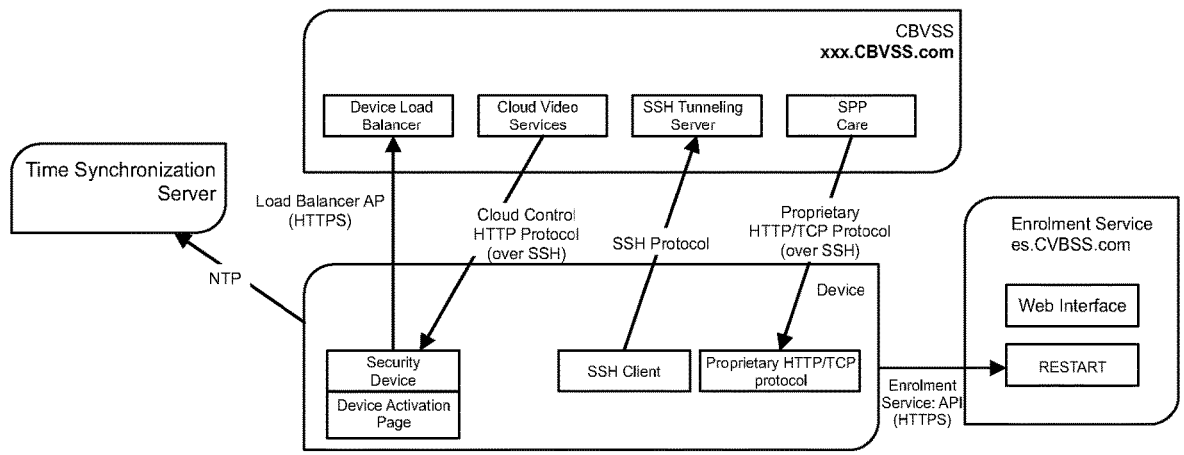
FIG. 12, is a block diagram illustrating the relationship between services of the security device, security server, enrolment server and others according to a particular example of implementation.

In the CBVSS protocol some network services are implemented by the CBVSS and used by the device while others are implemented in the device called by the CBVSS. FIG. 12, illustrates the relationship between services of the security server, enrolment server and others. These are the software components located in each entity (camera, enrolment service, security server) that communicate with each other to build the CBVSS, as described herein.

Cloud Services used by the device may include:
  Enrolment Service (HTTPS)
  Device Load Balancer (HTTPS)
  SSH Tunneling Server (SSH)
  NTP Time Synchronization Server
  Service implemented in the device firmware may include:
  SSH Client with port forwarding
  NTP Client
  CBVSS Device
    Cloud Control protocol (HTTP)
    Device activation page (HTML)

Enrolment Service: The first service, the Enrolment Service runs one instance globally in the cloud and is responsible for simplifying the discovery of devices over the internet and for getting the address of the SSP instance responsible to manage that device. In this example, the Internet address of the enrolment service never changes, it's the only URL that should be set to, for example, https://es.CBVSS.com in the device firmware.

Device Load Balancer: The second service is responsible to manage, stream and record video from the devices. As explained in the introduction, the CBVSS may comprise many instances of SSP distributed around the world. There are two modules in SSP that communicate with the device. The first module is the Device Load Balancer which is responsible to assign this device to a specific server of the SSP instance by returning information required to establish a SSH Tunnel.

SSH Tunneling Server: The second module is deployed on multiple servers and is called the SSH Tunneling Server which acts as a transparent but secure tunnel between SSP and the device. This transparency allows the CBVSS to use any proprietary or standard TCP based protocol to control and stream video from the device. In this example, all service used by the CBVSS are over HTTP including video streaming, RTSP over HTTP. The HTTP Requests or streams are securely funneled through that secure SSH connection using a SSH remote port forwarding mechanism.

NTP Time Server: The enrolment service has a public API call to return the address of a Time Server that is used by the CBVSS. This time server must be set in the device to allow proper security mechanism to avoid replay attacks.

Cloud Control Protocol (Device Firmware): The cloud control protocol is a small set of HTTP commands implemented in the device/camera required by the CBVSS to automatically discover the services available on the device and provide some commands that are specific to the cloud.

Device Activation Page (Device Firmware): A set of HTML pages that are used in the camera web server to activate the camera in the CBVSS. In this example every CBVSS-compliant camera has the page accessible at the same default location, e.g.: http://ipaddress/CBVSS/

Figure 13:
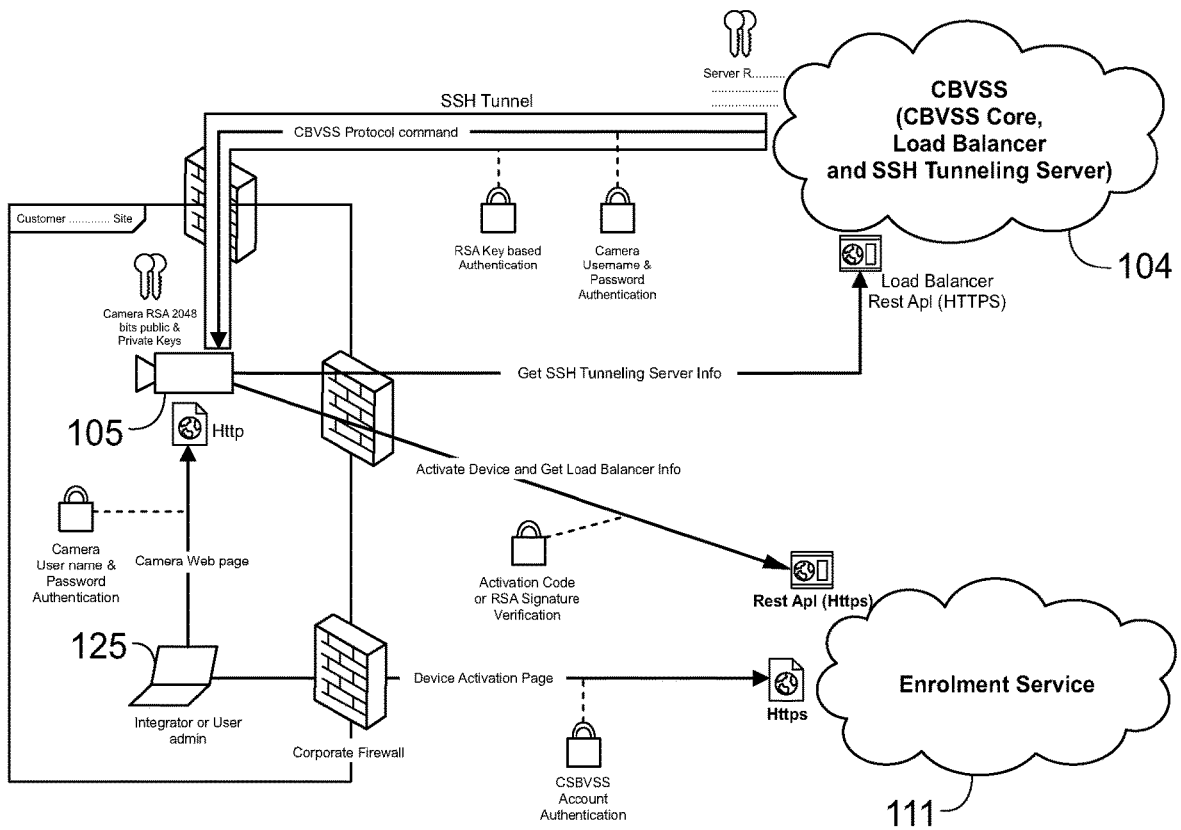
FIG. 13 shows a block diagram of a security system according to a particular example of implementation.

Authentication and Security:

Customers are concerned with privacy and expect their video to be transmitted securely. The common use case consists of keeping all devices in a private network behind the corporate firewall in order to protect them from potential threats coming from the internet. Basing the architecture on this use case, FIG. 13 is a system view similar to FIG. 1 but showing specific details of the present example, giving an overview of authentication mechanisms used between different components in the system.

Sequence Diagrams Device Connection:

Connecting a new device: When a device is enrolled for the first time in the CBVSS, the integrator must follow the enrolment steps that will assign this device to a specific SSP instance through its Device Load balancer Server. This may follow a sequence similar to that shown in FIG. 4.

Existing device reboot: Every time the device reboots, it must automatically reconnect to its dedicated SSP instance through the Device Load Balancer. The connection information of the Device Load Balancer should be stored in non-volatile memory so the device quickly reconnects directly to the same SSP instance after a reboot or a network loss. FIG. 12 illustrates the steps required here in a manner similar to FIG. 4, where like steps may occur in the manner described with respect to FIG. 4.

Cloud Services:

Enrolment Service API:

HTTPS layer: The Enrolment Service API of this example is using REST over HTTPS. This means any communication with the service has to be done using HTTPS requests.

Known HTTP headers: The Enrolment Services uses some headers in this example:

Accept: The Accept request-header field can be used to specify certain media types which are acceptable for the response. Accept headers can be used to indicate that the request is specifically limited to a small set of desired types, as in the case of a request for an in-line image. Accepted values are:

Application/xml

Content-Type: The Content-Type entity-header field indicates the media type of the entity-body sent to the recipient or, in the case of the HEAD method, the media type that would have been sent had the request been a GET. Accepted values are:

Application/xml

X-CBVSS-date: The x-CBVSS-date in this example is in full date format from RFC 822, updated by RFC 1123. For example: x-CBVSS-date: Sun, 6 Nov. 1994 08:49:37 GMT Authorization-Manufacturer: The Authorization-Manufacturer header is used to authenticate/validate the request where the reference identifier is the manufacturer. The corresponding value must be the manufacturer account name in lower case. See "Security Implementation" for more details.

Authorization-Camera: The Authorization-Camera header is used to authenticate/validate the request where the reference identifier is the camera. The corresponding value must be the device Id in lower case. See "Security Implementation" for more details.

X-CBVSS-device-model: The x-CBVSS-device-model header is a string representing the model of the device doing the request. It is used for debugging purpose.

X-CBVSS-device-firmware-version: The x-CBVSS-device-firmware-version is a string representing the firmware version of the device doing the request. It is used for debugging purpose.

Base URL: All URLs referenced in this Web API documentation have the following certain base. E.g. https://es.CBVSS.com/api/2015-02-10/. Note that address and other addresses herein are provided as an example for illustration purpose only as the actual address may be different. Only certified cameras will be accepted to communicate on the URL above.

Get NTP Server: The "Get NTP Server" request should be called to get the NTP server's address. The NTP's time is going to be used with the x-CBVSS-date http header which is then used within the request.

Request:

| Method | URL |
|--------|-----|
| GET | /System/Ntp/<AccountName>/<DeviceUniqueID> |

Authentication:

Required authentication signatures, see the "Security Implementation" section for implementation details.

| Signed with private key(s) |
|---|

Parameters (Http Header) in this Example:

| Property | Value Type | Description |
|----------|------------|-------------|
| x-CBVSS-device-model | string (min 1, max 50) | Accepted characters are '_', '-', '.', '(', ')', (0-9) and (A-Z). |
| x-CBVSS-device-firmware-version | string (min 1, max 50) | Accepted characters are '_', '-', '.', '(', ')', (0-9) and (A-Z). |
| Content-Type (Support multiple) | String ('application/json' or 'application/xml') | The accepted content types of the load balancer HTTP server are 'application/json' and 'application/xml' and the server can process request provided JSON and XML formats. |

-continued

| Property | Value Type | Description |
|---|---|---|
| Accept (Support multiple) | String ('application/json' or 'application/xml') | The accepted content types of the load balancer HTTP server are 'application/json' and 'application/xml' and the server can send back in JSON and XML formats. Unless the device specifies that it only supports JSON, the server will send the response to the request in XML format. |

Parameters (URL) in this Example:

| Property | Value Type | Description |
|---|---|---|
| AccountName | string (min 1, max 25) | Accepted characters are (0-9) and (A-Z). This field is used to look up and authenticate the request. The exact value may be provided by the CBVSS manager. |
| DeviceUniqueID | string (12 characters) | Accepted characters are hexadecimal digits, (0-9) and (A-F). The device unique Id is expected to be the MAC address of the device without the separating hyphen "-" or colon ":" in between each byte. |

Response:

| Http Status | Description |
|---|---|
| 200 - OK | Returns the information to the NTP server to synchronise the device date and time. |
| Address | The NTP server's address. |
| Example | <GetNtpServerResponse><br><Address>time.windows.com</Address><br></GetNtpServerResponse> |
| 400 - Bad request | Any validation error will be responded with this code. |

Register device: In this example, the API endpoint is called as soon as the device owner or integrator enters the activation code in the device web page. This endpoint in this example is called only once by a device. In the case where the device needs the information returned by this request, the Get Connection Information request may be used.

The method is called by the device when the user press "Activate" in the device activation page. It pushes the Device Activation Code and Device RSA Public Key to the Enrolment Service in order to receive the connection information about its Device Load Balancer and SSH Tunneling Server authentication information. In this example, all response information is stored in non-volatile memory of the device.

That method can only be called once for one Device in this example, the activation code expires after usage.

Request:

| Method | URL |
|---|---|
| POST | /Device/Register/<AccountName>/<DeviceUniqueID> |

Authentication:

The authentication signatures, see the "Security Implementation" section for implementation details.

| Signed with private key(s) |
|---|
| Manufacturer |

Parameters (Http Header) in this Example:

| Property | Value Type | Description |
|---|---|---|
| x-CBVSS-device-model | string (min 1, max 50) | Accepted characters are '_', '-', '.', '(', ')', (0-9) and (A-Z). |
| x-CBVSS-device-firmware-version | string (min 1, max 50) | Accepted characters are '_', '-', '.', '(', ')', (0-9) and (A-Z). |
| Content-Type (Support multiple) | String ('application/json' or 'application/xml') | The accepted content types of the load balancer HTTP server are 'application/json' and 'application/xml' and the server can process request provided JSON and XML formats. |
| Accept (Support multiple) | String ('application/json' or 'application/xml') | The accepted content types of the load balancer HTTP server are 'application/json' and 'application/xml' and the server can send back in JSON and XML formats. Unless the device specifies that it only supports JSON, the server will send the response to the request in XML format. |

Parameters (URL) in this Example:

| Property | Value Type | Description |
|---|---|---|
| AccountName | string (min 1, max 25) | Accepted characters are (0-9) and (A-Z). This field is used to look up and authenticate the request. The exact value is provided by the CBVSS manager. |
| DeviceUniqueID | string (12 characters) | Accepted characters are hexadecimal digits, (0-9) and (A-F). The device unique Id is expected to be the MAC address of the device without the separating hyphen "-" or colon ":" in between each byte. |

Parameters (Body) in this Example:

| Property | Value Type | Description |
|---|---|---|
| DeviceActivationCode | String (7 characters) | Accepted characters are (0-9) and (A-Z). Value enter by the user in the device activation page |
| DeviceRsaPublicKey | string | PEM formatted RSA public key string. |
| Example | | <RegisterRequest><br>　<DeviceActivationCode>A1BC2X5</DeviceActivationCode><br>　<DeviceRsaPublicKey><br>　---- RSA PUBLIC KEY ----<br>　---- END RSA PUBLIC KEY ----<br>　</DeviceRsaPublicKey><br></ RegisterRequest > |

Response:

| Http Status | Description |
|---|---|
| 200 - OK | The device has been activated. Returns the information to connect to the CBVSS Device Load Balancer. |
| DeviceLoadBalancerUri Example | The Device Load Balancer server Uri. <RegisterResponse><br>　<DeviceLoadBalancerUri>https://loadBalancer.CBVSS.com:4681</DeviceLoadBalancerUri><br></RegisterResponse> |
| 400 - Bad request | Any validation error will be responded with this code. |
| 401 - Unauthorized | Any authentication/authorization error will be responded with this code. |
| 403 - Forbidden | When a device is not allowed into the system. |
| 404 - Not Found | This will happen if the Register is called before the 'Generate Activation Code' |

Get Connection Information: This request is used to obtain the connection information for a given device. It returns Device Load Balancer connection information. All response information should be stored into non-volatile memory of the device.

Request:

| Method | URL |
|---|---|
| GET | /Device/ConnectionInformation/<AccountName>/<DeviceUniqueID> |

Authentication:

Authentication signatures, see the "Security Implementation" section for implementation details.

Signed with private key(s)
Manufacturer
Camera

Parameters (Http Header) in this Example:

| Property | Value Type | Description |
|---|---|---|
| Authorization | string | Refer to the Security Implementation document |
| x-CBVSS-date | UTC RFC 1123 date and time | The date and time at which the request was done. Used in the Authorization header. |
| x-CBVSS-device-model | string (min 1, max 50) | Accepted characters are '_', '-', '.', '(', ')', (0-9) and (A-Z). |
| x-CBVSS-device-firmware-version | string (min 1, max 50) | Accepted characters are '_', '-', '.', '(', ')', (0-9) and (A-Z). |
| Content-Type (Support multiple) | String ('application/json' or 'application/xml') | The accepted content types of the load balancer HTTP server are 'application/json' and 'application/xml' and the server can process request provided JSON and XML formats. |
| Accept (Support multiple) | String ('application/json' or 'application/xml') | The accepted content types of the load balancer HTTP server are 'application/json' and 'application/xml' and the server can send back in JSON and XML formats. Unless the device specifies that it only supports JSON, the server will send the response to the request in XML format. |

Mandatory Parameters in this Particular Example (URL):

| Property | Value Type | Description |
|---|---|---|
| AccountName | string (min 1, max 25) | Accepted characters are (0-9) and (A-Z). This field is used to look up and authenticate the request. The exact value is provided by the CBVSS manager. |
| DeviceUniqueID | string (12 characters) | Accepted characters are hexadecimal digits, (0-9) and (A-F). The device unique Id is expected to be the MAC address of the device without the separating hyphen "-" or colon ":" in between each byte. |

Response:

| Http Status | Description |
|---|---|
| 200 - OK | The device is already activated and been assigned to a SSP. Returns the information to connect to the CBVSS Device Load Balancer. |
| DeviceLoadBalancer Uri | The Device Load Balancer server Uri. |
| Example | <GetConnectionInformationResponse><br>    <DeviceLoadBalancerUri>https://loadBalancer1.CBVSS.com:4681</DeviceLoadBalancerUri><br></GetConnectionInformationResponse> |
| 400 - Bad request | Any validation error will be responded with this code. |
| 401 - Unauthorized | Any authentication/authorization error will be responded with this code. |
| 403 - Forbidden | When a device is not allowed into the system. |
| 404 - Not Found | - When a device is not found in the system, but the manufacturer is authorized and authenticated. This means that the device is not registered in the system. |
| Example | <ErrorModel><br>    <Error>Device has been disabled</Error><br>    <Code>NotSupportedFirmwareVersion</Code><br></ErrorModel> |

Redirect to CBVSS Device Enrolment

This link is used in the device's CBVSS page to redirect the user to the CBVSS' device registration page.

This request is intended as a link (in a browser such as Internet Explorer) that a person can click on the Device Activation Page.

Request:

| Method | URL |
|---|---|
| GET | /Registration/<AccountName>/<DeviceUniqueID> |

Authentication:
Authentication signatures, see the "Security Implementation" section for implementation details.
Signed with Private Key(s)
Parameters (Http Header) in this Example:

| Property | Value Type | Description |
|---|---|---|
| x-CBVSS-device-model | string (min 1, max 50) | Accepted characters are '_', '-', '.', '(', ')', (0-9) and (A-Z). |
| x-CBVSS-device-firmware-version | string (min 1, max 50) | Accepted characters are '_', '-', '.', '(', ')', (0-9) and (A-Z). |
| Content-Type (Support multiple) | String ('application/json' or 'application/xml') | The accepted content types of the load balancer HTTP server are 'application/json' and 'application/xml' and the server can process request provided JSON and XML formats. |

| Property | Value Type | Description |
|---|---|---|
| Accept (Support multiple) | String ('application/json' or 'application/xml') | The accepted content types of the load balancer HTTP server are 'application/json' and 'application/xml' and the server can send back in JSON and XML formats. Unless the device specifies that it only supports JSON, the server will send the response to the request in XML format. |

Parameters (URL) in this Example:

| Property | Value Type | Description |
|---|---|---|
| AccountName | string (min 1, max 25) | Accepted characters are (0-9) and (A-Z). This field is used to look up and authenticate the request. The exact value is provided by the CBVSS manager. |
| DeviceUniqueID | string (12 characters) | Accepted characters are hexadecimal digits, (0-9) and (A-F). The device unique Id is expected to be the MAC address of the device without the separating hyphen "-" or colon ":" in between each byte. |

Response:

| Http Status | Description |
|---|---|
| 302 - Found | A standard 302 redirect will be issued to the browser and the user will be prompted to logon to the CBVSS |
| 404 - Not Found | Returned if the device manufacturer is not found. |

Device Load Balancer:

Overview: The device load balancer is a secured and trusted HTTPS server that redirects the device to a Secured SSP. In this example, this server is the entry point of the device to the CBVSS. The device authenticates itself to the server by a providing an RSA signed connection request to the Load Balancer. The load balancer verifies the device authenticity, gets its initial communication parameters and redirects the device to the right System on a success scenario.

The deployment of the Device Load Balancer may is implemented in this example using HTTP. In an alternate example, it may be deployed using HTTPS. FIG. 12 is an event flow diagram showing interactions between the camera, load balancer and SSH Tunneling Service in accordance with this example.

Base URL: The URL to connect to the CBVSS Device Load Balancer is given by the enrolment service as a result of the Register call. This URL is stored in this example in the non-volatile memory of the device.

Here is an example of what the Base URL returned by the Enrolment Service look like: https://scwesteurope1.deviceloadbalancer.CBVSS.com The device in this example adds the api and version. Ex: /api/2015-02-10/

The composition of these two parts in this example end up forming this url: https://scwesteurope1.deviceloadbalancer.CBVSS.com/api/2015-02-10/

Connect: Connect to the Device Load Balancer in order to receive the connection information about its SSH Tunneling Server. In this example, the API endpoint may be called every time it has the device load balancer address in its non-volatile memory and it is not connected to a CBVSS. If the load balancer service is unavailable at the time of the request. The device should retry this call every 30 seconds.

Request:

| Method | URL |
|---|---|
| POST | /Device/Connect/<AccountName>/<DeviceUniqueID> |

Parameters (URL) in this Example

| Property | Value Type | Description |
|---|---|---|
| AccountName | string (min 1, max 25) | Accepted characters are (0-9) and (A-Z). This field is used to look up and authenticate the request. The exact value is provided by the CBVSS manager. |
| DeviceUniqueID | string (12 characters) | Accepted characters are hexadecimal digits, (0-9) and (A-F). The device unique Id is expected to be the MAC address of the device without the separating hyphen "-" or colon ":" in between each byte. |

Parameters (Http Header) in this Example:

| Property | Value Type | Description |
|---|---|---|
| Authorization | string | Refer to . . . |
| x-CBVSS-date | UTC RFC 1123 date and time | The date and time at which the request was done. Used in the Authorization header. |
| x-CBVSS-device-model | string (min 1, max 50) | Accepted characters are '_', '-', '.', '(', ')', (0-9) and (A-Z). |
| x-CBVSS-device-firmware-version | string (min 1, max 50) | Accepted characters are '_', '-', '.', '(', ')', (0-9) and (A-Z). |

-continued

| Property | Value Type | Description |
|---|---|---|
| Content-Type (Support multiple) | String ('application/json' or 'application/xml') | The accepted content types of the load balancer HTTP server are 'application/json' and 'application/xml' and the server can process request provided JSON and XML formats. |
| Accept (Support multiple) | String ('application/json' or 'application/xml') | The accepted content types of the load balancer HTTP server are 'application/json' and 'application/xml' and the server can send back in JSON and XML formats. Unless the device specifies that it only supports JSON, the server will send the response to the request in XML format. |

Parameters (Body) in this Example

| Property | Value Type | Description |
|---|---|---|
| AdditionalServices | xml node | A list of additional services . . . |
| Username | string (min 1, max 25) | Administrator Username that will be used by the SSP to push any request (HTTP, RTSP, proprietary protocol, cloud control protocol) to the device. This username should not be used as SSH session control username. The SshUsername will provided by the response of the connect request. For security reasons, we recommend that the device creates dynamically a user that is specific to the CBVSS. We suggest "CBVSSuser" as a username. That user has administrative privileges over the device. And this user only exists during a CBVSS session. i.e. Created just before connecting to the CBVSS load balancer and Deleted on A load balancer error response or at the end of a SSH tunneling session with the CBVSS. |
| Password | string (min 1, max 25) | Proprietary control protocol password. For security reasons, We recommend that the device creates dynamically a random password for its CBVSS user. We recommend that this password always changes at each new session with the CBVSS. And this password stays the same during a CBVSS session. i.e. Created just before connecting to the CBVSS load balancer and Deleted on A load balancer error response or at the end of a SSH tunneling session with the CBVSS. |
| DeviceSshPublicKey Example | String | Base64 public key of the RSA certificate of the device used to communicate with the SSH server.<br><ConnectRequest><br>  <AdditionalServices><br>    <Service><br>      <Name>Rtsp</Name><br>    </Service><br>    <Service><br>      <Name>Http</Name><br>    </Service><br>  </AdditionalServices><br>  <Username>CBVSSuser</Username><br>  <Password>1FjzEghR225!-ca_jD</Password><br>  <DeviceSshPublicKey>BASE64 ENCODED DATA</DeviceSshPublicKey></ConnectRequest> |

Response:

| Http Status | Description |
|---|---|
| 200 - OK | The device has been accepted. Returns the information to connect to the CBVSS tunneling service. |
| SSHServerAddress | The SSH Tunneling server address |
| SSHServerPort | The SSH Tunneling server port |
| SSHUsername | The username that needs to be used to communicate with the SSH server. |
| SSHServerPublicKey | Base64 public key of the RSA certificate of the server used to communicate with the SSH server. |

| Http Status | Description |
| --- | --- |
| RemoteCBVSSControlProtocol Port | This is the SSH Remote Port used by the Device Gateway to communicate to the camera using the CBVSS Control Protocol. This value need to be sent by the SSH client of the device while doing Remote port forwarding requests. This will be the remote port of the device CBVSS Control Protocol service. The listening port on the camera can be on a different port. |
| RemoteProprietaryProtocol Port | This is the SSH Remote Port used by the Device Gateway to communicate to the camera using the camera proprietary protocol. This value needs to be sent by the SSH client of the device while doing Remote port forwarding requests. This will be the remote port of the device Proprietary Protocol service. The listening port on the camera can be on a different port. |
| AdditionalServices | This is a list of additional services that the camera supports with their related SSH remote ports that the SSH server will use internally.<br>This value needs to be sent by the SSH client of the device while doing Remote port forwarding requests. This will be the remote ports of the device additional services they will provide. The listening port of the additional services on the camera can be set on different ports. |
| Example | `<ConnectResponse>`<br>    `<SshServerAddress>scwesteurope.tunnel1.CBVSS.com</SshServerAddress>`<br>    `<SshServerPort>8080</SshServerPort>`<br>    `<SshUsername>S1hD3355FdSa</SshUsername>`<br>    `<SshServerPublicKey>>`<br>`<BASE64 ENCODED DATA>`<br>`</SshServerPublicKey>`<br>    `<RemoteCBVSSControlProtocolPort>12339</RemoteCBVSSControlProtocolPort>`<br>    `<RemoteProprietaryProtocolPort>12340</RemoteProprietaryProtocolPort>`<br>    `<AdditionalServices>`<br>      `<Service>`<br>        `<Name>Rtsp</Name>`<br>        `<Port>12341</Port>`<br>      `</Service>`<br>      `<Service>`<br>        `<Name>Http</Name>`<br>        `<Port>12342</Port>`<br>      `</Service>`<br>    `</AdditionalServices>`<br>`<ConnectResponse>` |
| 400 - Bad request | Any validation error will be responded with this code. If device receives this error code. It should discard the Load Balancer information's in its non-volatile memory and get back to the enrolment service to refresh its SSP information's. |
| 401 - Unauthorized | Any authentication/authorization error will be responded with this code. If device receives this error code. It should discard the Load Balancer information's in its non-volatile memory and get back to the enrolment service to refresh its SSP information's. |
| 500 - Internal Server Error | Any errors that is not related to parameters entered. Error will be responded with this code. If device receives this error code it can retry few times. If the problem persist, It should discard the Load Balancer information's in its non-volatile memory and get back to the enrolment service to refresh its SSP information's. |

SSH Tunneling Services:

Authentication and Remote Port Forwarding:

SSH protocol provides many authentication mechanisms but the public key authentication remains the strongest method available for the time being. Therefore, the CBVSS SSH Server of this example relies on this key-based authentication mechanism to validate all devices connecting to the system. At the same time, all devices authenticate the server in order to ensure that they are not communicating with the wrong server. In this authentication process every actor in the system has a unique identity represented by a pair of private and public keys.

Basically, every device in the system generates a 2048 bits RSA ("Rivest-Shamir-Adleman") public and private key, and share the public key with the server for authentication purposes. The private key is not transmitted on the network since it will be used to decrypt messages sent by the server during the authentication process. At the same time, the server will also share its public key at the beginning of the process. Then, before opening the SSH session, the client will verify that the server is part of the registered known hosts and the server will validate the client signature.

Figure 14:
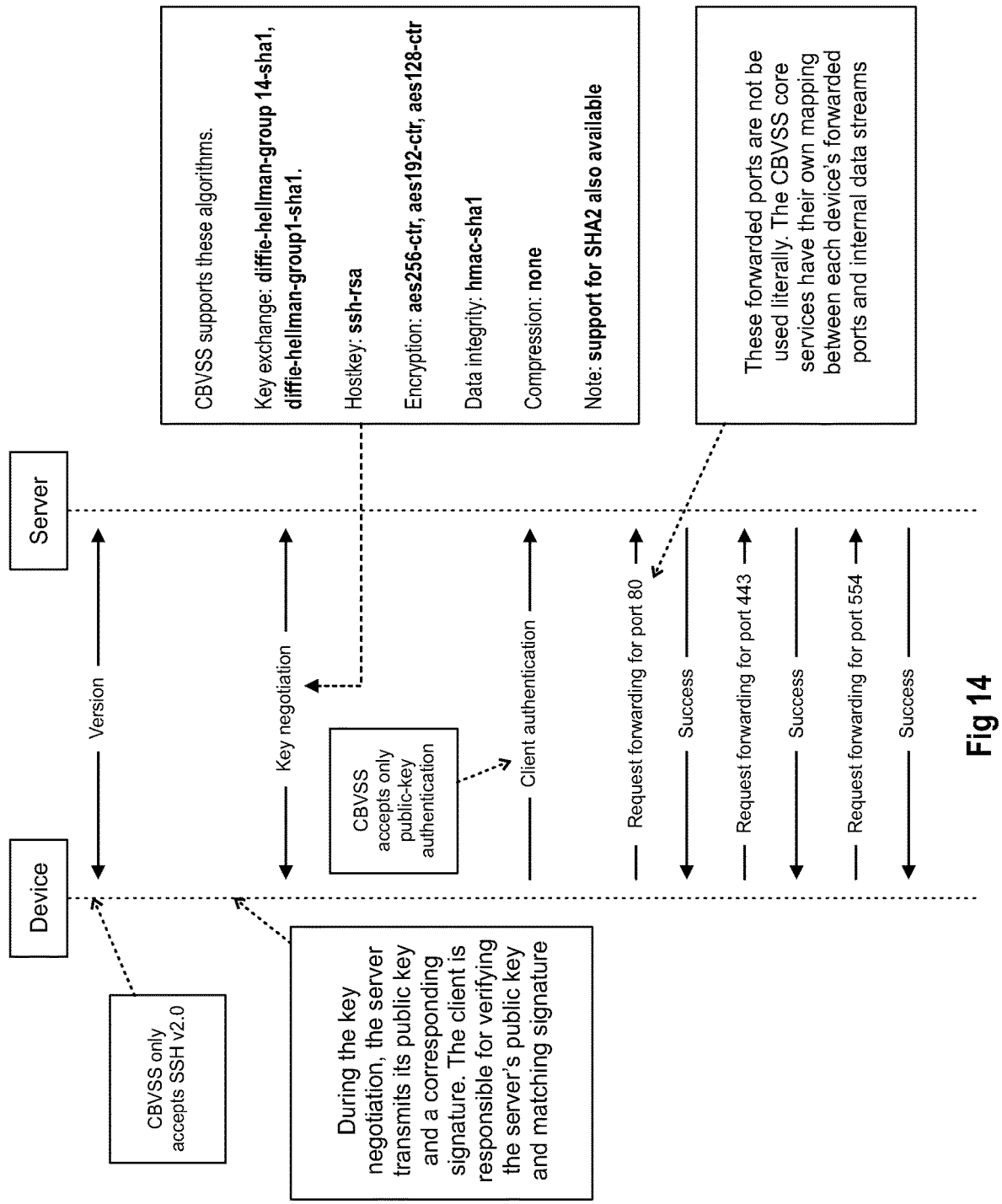
FIG. 14 is an event flow diagram illustrating an overview of an SSH session negotiation sequence between the security device and the security server.
Figure 25:
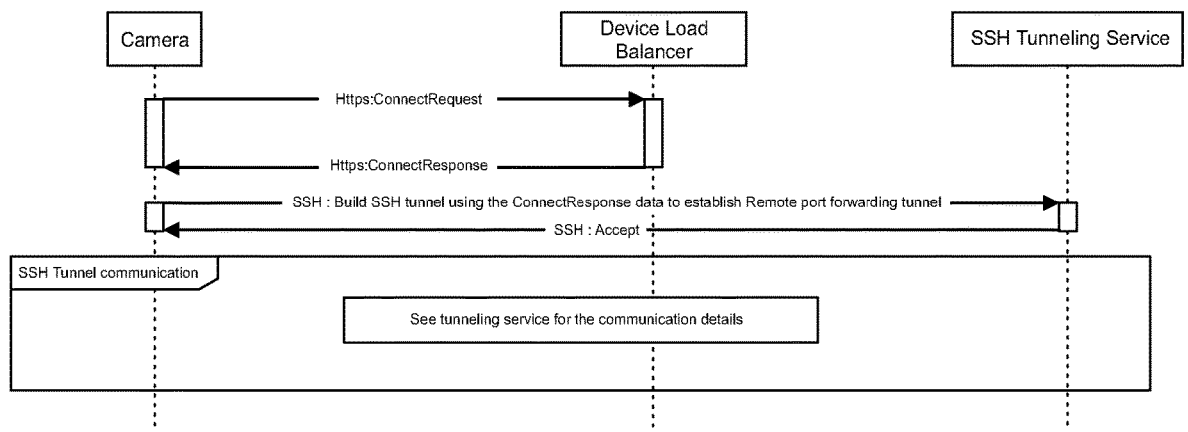
FIG. 25 is an event flow diagram illustrating the implementation of SSH tunneling in a particular example of implementation.

FIG. 14 is an event flow diagram illustrating an overview of the SSH session negotiation sequence and FIG. 25 is an event flow diagram illustrating the implementation of SSH tunneling in the present example.

SSH public key authentication works in this example as follows:

1. The device is configured with a SSH username and a public/private key pair.
   a. NB: The private key should be never stored plain text.
2. The device's SSH username and public key are added to an authentication list on the server. Note that the private key is known only to the device.
3. Once the SSH key exchange has been completed between the device and the server, the device sends a public-key authentication request containing the following:
   a. SSH username
      i. The server will look up this username in its authentication list
   b. Device's SSH public key
      i. This public key must be the same as what the server has in its authentication list for that user
   c. Signature
      i. This signature proves to the server that the device knows the private key. The signature contains information known to both the server and the device, such as the session identifier that has been negotiated during the key exchange. The device encrypts the signature with its SSH private key. Upon reception, the server decrypts the signature with the public key it has on record for this SSH user, and if it finds the expected decrypted information in the signature, the identity of the device is proven.

After authentication, the device must request SSH remote port forwarding for each of the ports that are needed for the services exposed to CBVSS. When the device connected to the Device Load Balancer, it requested a list of ports, and only these ports will be accepted and must be used when requesting remote port forwarding. For example, in the previous diagram, the device requests remote port forwarding for the following services HTTP (port 80), HTTPS (port 443) and RTSP (port 554).

Figure 15:
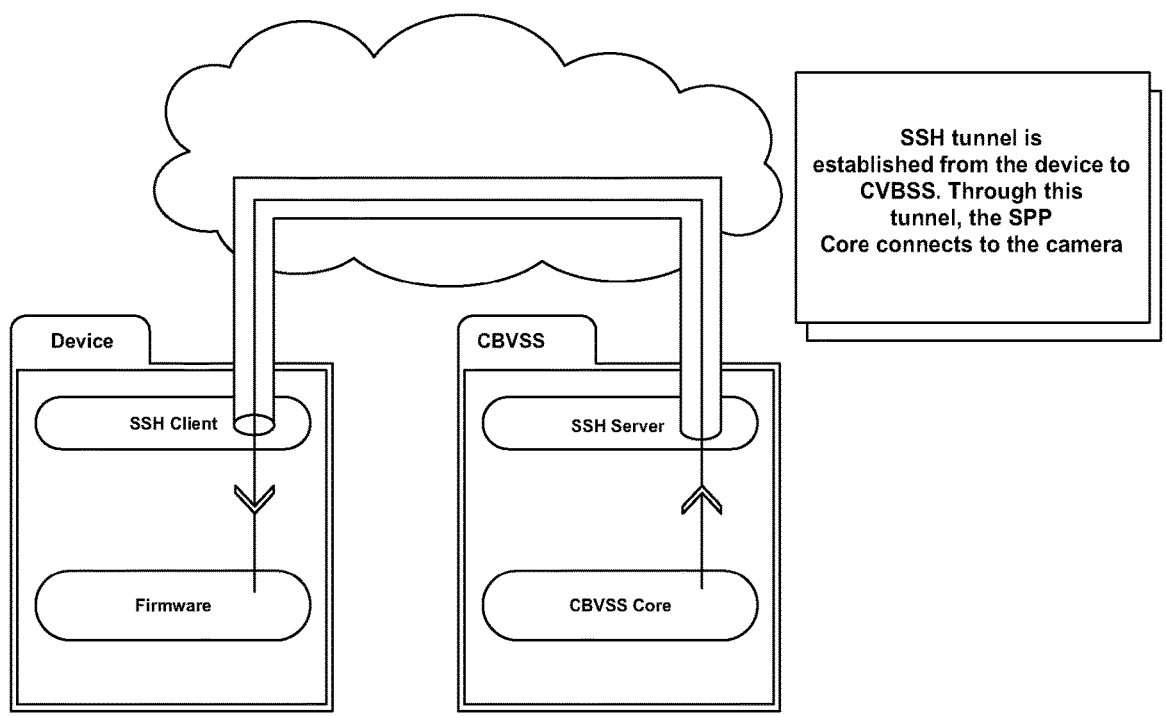
FIG. 15 is a block diagram illustrating an SSH tunnel connection between the camera and CBVSS of the system of FIG. 13.
Figure 16:
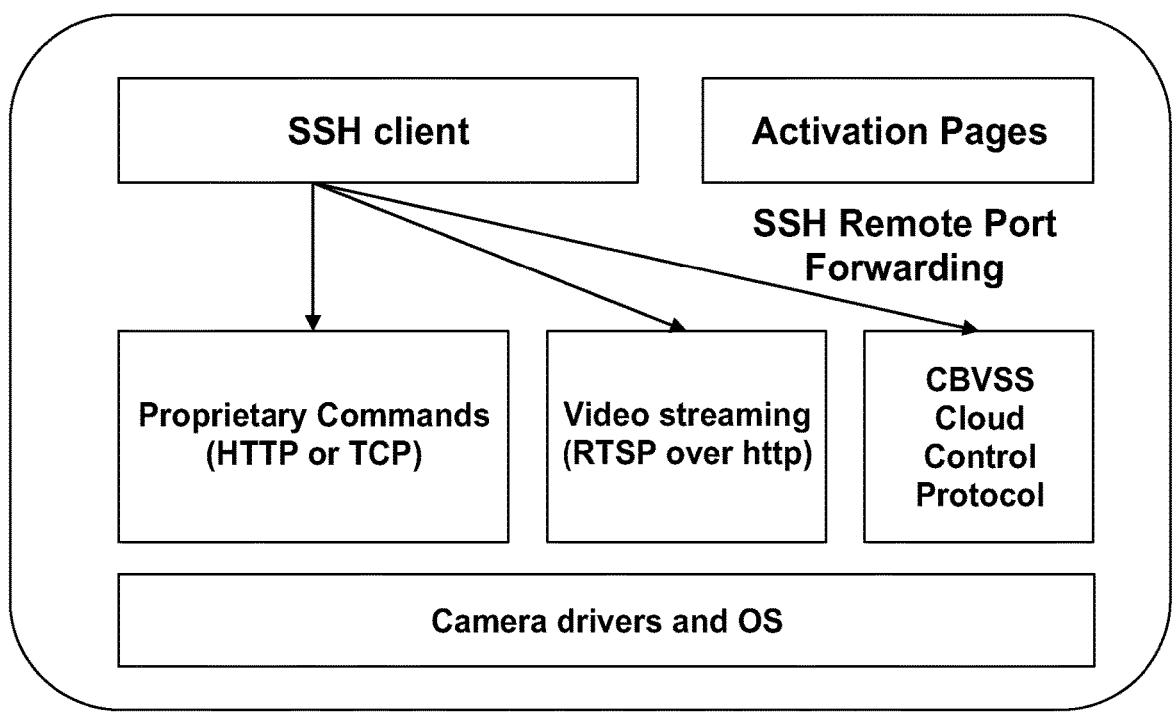
FIG. 16 is a block diagram illustrating logical camera components of the camera of the system of FIG. 13.
Figure 20:
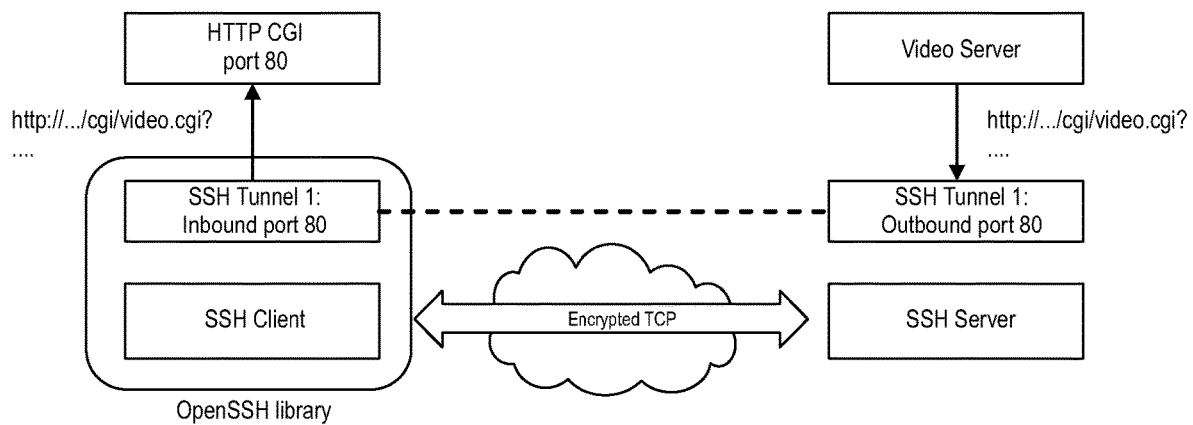
FIG. 20 is a block diagram illustrating an SSH connection between a video server and SSH client.

Once the necessary SSH remote port forwarding have been set in place, the CBVSS core components will be able to connect to the device using a secure SSH tunnel, as illustrated in FIG. 15 and FIG. 20.

Services in the Device:

On top of existing services, three new main services are required to be integrated in the device:
SSH Client
CBVSS Cloud Control Protocol
CBVSS Activation Pages
See FIG. 15.

SSH Client

The SSH client component on the device is responsible of initiating a secure connection with the CBVSS. There are many free implementation of SSH-2 available online, but we recommend the usage of OpenSSH or DropBear SSH because they are already integrated in many devices today.

SSH Client Failure Scenarios: In this example, in all cases the CBVSS SSH Server sends a disconnect reason, the SSH Client may or may not display the message.

| Scenario | Result |
| --- | --- |
| Device connects with an invalid or a previous user | SSH Server refuses the connection and sends a user authentication failure. |
| Device requests a remote port that was not assigned to it. | SSH Server refuses the connection and sends a message like:<br>Remote Port Forwarding not allowed for username:port |
| Device takes more than 120 seconds between the time it contacts the Device Load Balancer and the time it connects. | SSH Server refuses the connection and sends a user authentication failure. |
| Device fails to provide a proper response to the CBVSS Control Protocol Describe call. | SSH Server closes the connection and sends a message like:<br>Device discovery failed |
| Device responds with an invalid Protocol version to the CBVSS Control Protocol Describe call. | SSH Server closes the connection and sends a message like:<br>CBVSS Control Protocol version is invalid: protocolVersion |
| Device responds with an different DeviceUniqueId to the CBVSS Control Protocol Describe call | SSH Server closes the connection and sends a message like:<br>DeviceUniqueId mismatch: DescribeDeviceUniqueId OtherDeviceUniqueId |
| SSH Tunneling Services fails to broadcast a client hello to the SSP | SSH Server closes the connection and sends a message like:<br>Broadcast Client Hello failed |
| SSH Tunneling Services fails to broadcast a client connect to the SSP | SSH Server closes the connection and sends a message like:<br>Broadcast Client Connect failed |

Figure 17:
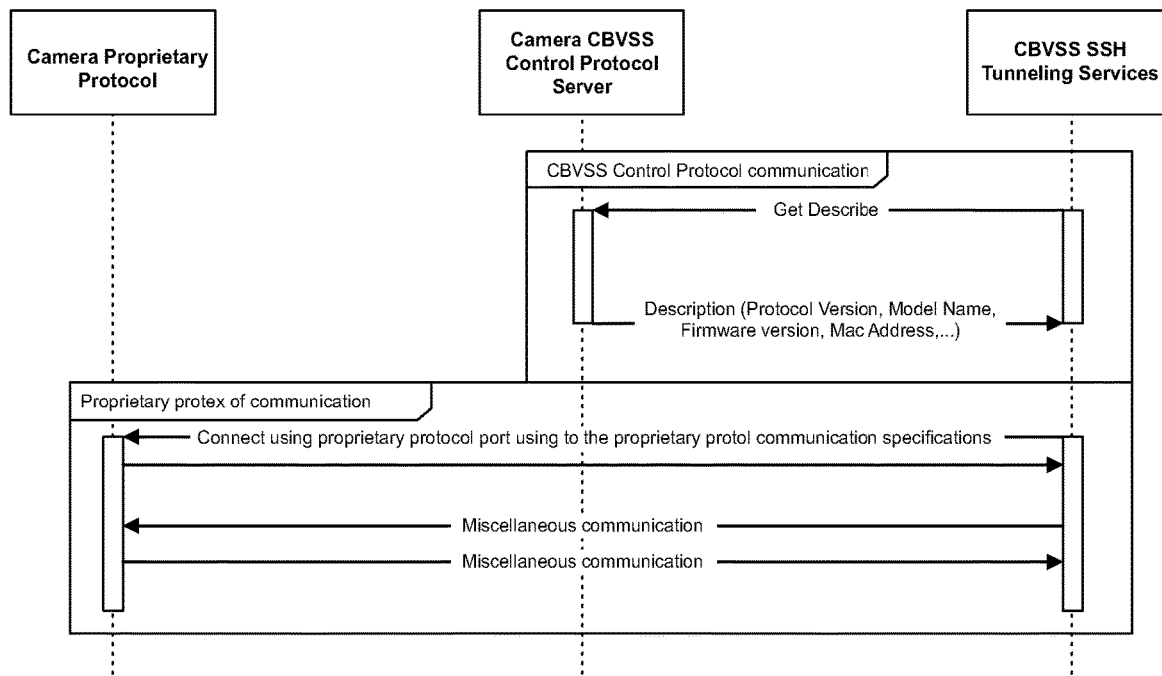
FIG. 17 is an event flow diagram illustrating communications between the camera CBVSS control protocol server and SSH Tunneling server according to the example of FIG. 13.

CBVSS Cloud Control Protocol:

Overview: The CBVSS Cloud Control Protocol is a lightweight http command and control protocol that is used to integrate a device to the CBVSS. The device acts as a server for this protocol and it needs to respond and do actions to all the following commands according to the specification requirements. FIG. 17 is an event flow diagram illustrating communications between camera CBVSS control protocol server and SSH Tunneling server according to this particular example. In particular, it shows the CBVSS requesting detailed information about the camera it is connecting to (e.g. model, version, firmware, MAC address). Using this information, the CBVSS then determines how to communicate with the camera, and particularly which protocol to use, e.g. from among several supported proprietary manufacturer's protocol.

Base URL: All URLs referenced in this Web API documentation in this example have the following exemplary base:

http://<YourDeviceIp>:<CBVSSControlProtocolPort>/CBVSS/api/

Authentication: In this example, the authentication mechanism is HTTP Basic authentication. Device implements the http basic authentication scheme for CBVSS Control Protocol. The basic authentication will become secure because it pass through the SSH secured channel. The accepted credentials are the credentials the device provided to the load balancer when it did the Connect request.

Content types: CBVSS control protocol client of this example always use XML format as content type. The CBVSS control protocol client accept XML and JSON as content types as response content. The documentation only shows XML content type.

Describe: Receives the description of the device.

Request:

| Method | URL |
|---|---|
| Get | /CBVSS/Api/Describe |

Parameters (Http Header) in this Example:

| Property | Value Type | Description |
|---|---|---|
| WWW-Authenticate | String | CBVSS Control protocol uses Basic authentication as authentication mechanism. The authentication scheme for CBVSS is in this example "CBVSS". |
| Authorization | String (Basic <base64>) | Basic authentication is used. The format is Authorization: Basic <base64 encoded username: pass> To form a base64 string. Format a string containing the username and password separated by ":" and then you convert that string into base64. Example: For username "admin" and password "pass". You take "admin" and "pass" and join them with a ":" in the middle. It gives you "admin:pass" then you apply to that string a base64 conversion. That will result as "dXNlcjphZG1pbg==". Then you create your header which is "Authorization: Basic dXNlcjphZG1pbg==" |
| Accept | String ('application/xml' or 'application/json') | CBVSS protocol accept as response from the device XML body and JSON body. All examples in this document are XML. So we recommend to use XML as response content. |
| Content-Type | String ('application/xml') | CBVSS control protocol will always send XML body to the device if there is any body to send. |
| Example | | In this example, because the Content-Type is specified as xml. The body of the request must be sent in xml format. Because the device specified that it accept both XML and JSON, the server will send back its data in XML because XML is the preferred communication channel between the load balancer and the devices. For example: WWW-Authenticate: Basic realm="CBVSS" Authorization: Basic dXNlcjphZG1pbg== Accept: application/xml Accept: application/json Content-Type: application/xml |

Response

| Http Status | Description |
|---|---|
| 200—OK | Return the description of the device. This description contains The following parameter id/value pairs. HTTP Header: Content-type: application/xml |
| ProtocolVersion | CBVSS control protocol version. |
| DeviceUniqueID | The device unique Id is expected to be the MAC address of the device without the separating hyphen "-" or colon ":" in between each byte. |
| CompanyName | The manufacturer's company name. |
| ModelName | Accepted characters are '_', '-', '.', (0-9) and (A-Z). |
| FirmwareVersion | Accepted characters are '_', '-', '.', (0-9) and (A-Z). |
| MacAddress | Accepted characters are (0-9) and (A-F). Must be 16 characters long |
| Example | <GetDescribeResponse> <ProtocolVersion>2015-02-10</ProtocolVersion> <DeviceUniqueID>0EDA8C110822 </DeviceUniqueID > <CompanyName>DeviceInc</CompanyName> <ModelName>FD6477</ModelName> <FirmwareVersion>1.4.3.1211 Cu</FirmwareVersion> <MacAddress>0EDA8C110822</MacAddress> </GetDescribeResponse> |

LightFactoryReset:

This operation is done when the device is considered faulty by the CBVSS.

The device in this example must first answer OK and then restore its configuration to factory default except for IP and DNS Server and restart the device.

Once the light factory reset is done, the unit needs to reconnect to the Enrolment Service by calling the "Get Connection Information" method and proceed with the regular flow.

Request:

| Method | URL |
| --- | --- |
| Post | CBVSS/Api/2015-02-10/LightFactoryReset |

Parameters (Http Header) in this Example

| Property | Value Type | Description |
| --- | --- | --- |
| WWW-Authenticate | String | CBVSS Control protocol uses Basic authentication as authentication mechanism. The authentication scheme for CBVSS is "CBVSS". |
| Authorization | String (Basic <base64>) | Basic authentication is used. The format is Authorization: Basic <base64 encoded username: pass> To form the base the base64 string. You take format a string containing the username and password separated by ":" and then you convert that string into base64. Example: For username "admin" and password "pass". You take "admin" and "pass" and join them with a ":" in the middle. It gives you "admin:pass" then you apply to that string a base64 conversion. That will result as "dXNlcjphZG1pbg==". Then you create your header which is "Authorization: Basic dXNlcjphZG1pbg==" |
| Accept | String ('application/xml' or 'application/json') | CBVSS protocol accept as response from the device XML body and JSON body. All example in this document is XML. So we recommend to use XML as response content. |
| Content-Type Example | String ('application/xml') | CBVSS control protocol in this example will always send XML body to the device if there is any body to send. In this example, because the Content-Type is specified as xml. The body of the request must be sent in xml format. Because the device specified that it accept both XML and JSON, the server will send back its data in XML because XML is the preferred communication channel between the load balancer and the devices. WWW-Authenticate: Basic realm="CBVSS" Authorization: Basic dXNlcjphZG1pbg== Accept: application/xml Accept: application/json Content-Type: application/xml |

Response

| Http Status | Description |
| --- | --- |
| 200—OK | The request is accepted and the light factory reset operation will be treated. |

Unregister: This operation is done when the camera is unregistered from the CBVSS. The device first needs to answer OK and then it needs to clear all information related to the CBVSS Control Protocol. Once unregistered, the camera should not communicate with the CBVSS. It is the responsibility of the device to gracefully disconnect from the system.

Request:

| Method | URL |
| --- | --- |
| Post | CBVSS/Api/2015-02-10/Unregister |

Parameters (Http Header) in this Example:

| Property | Value Type | Description |
| --- | --- | --- |
| WWW-Authenticate | String | CBVSS Control protocol uses Basic authentication as authentication mechanism. The authentication scheme for CBVSS is "CBVSS". |
| Authorization | String (Basic <base64>) | Basic authentication is used. The format is Authorization: Basic <base64 encoded username:pass> To form your base the base64 string. You take format a string containing the username and password separated by ":" and then you convert that string into base64. Example: For username "admin" and password "pass". You take "admin" and "pass" and join them with a ":" in the middle. |

-continued

| Property | Value Type | Description |
|---|---|---|
| | | It gives you "admin:pass" then you apply to that string a base64 conversion. That will result as "dXNlcjphZG1pbg==". Then you create your header which is "Authorization: Basic dXNlcjphZG1pbg==" |
| Accept | String ('application/xml' or 'application/json') | CBVSS protocol accept as response from the device XML body and JSON body. All example in this document is XML. So we recommend to use XML as response content. |
| Content-Type Example | String ('application/xml') | CBVSS control protocol will always send XML body to the device if there is any body to send in this example. In this example, because the Content-Type is specified as WWW-Authenticate: Basic realm="CBVSS" Authorization: Basic dXNlcjphZG1pbg== Accept: application/xml Accept: application/json Content-Type: application/xml xml. The body of the request must be sent in xml format. Because the device specified that it accept both XML and JSON, the server will send back its data in XML because XML is the preferred communication channel between the load balancer and the devices. |

Response

| Http Status | Description |
|---|---|
| 200—OK | The request is accepted and the unregister operation will be treated. |

Activation Pages for CBVSS:

The CBVSS activation web pages is a simple set of HTML pages included in the device web server to simplify the enrolment of a device in the CBVSS.

These pages should be contained in the firmware release of any CBVSS compatible device.

The integrator in this example should be able to access it by opening a browser at http://<device ip address>/CBVSS Security Requirements:

HTTPS certificate validation: In this example, all HTTPS services exposed by CBVSS are signed with an SSL certificate signed by a trusted certificate authority. For services exposed by the CBVSS, the device should refuse revoked certificates or certificates not signed by a trusted CA to prevent any tempering with the device.

TLS 1.0: In this example, HTTPS services exposed by CBVSS do not support SSL 2.0 or SSL 3.0 since these protocols have been broken. The server thus forces the client to use at least TLS 1.0, again for this particular example of implementation.

SSH Server Public Key: The device verifies that the public key received by the Device Load Balancer matches the SSH Server.

SSH Device Key: The public and private key pair is unique to a device.

Scenarios:

Recovery Procedure:

The recovery procedure should be initiated by the device whenever the connection to the CBVSS is lost. The initial step of the procedure depends on the information currently available in the non-volatile memory of the device. The shortest path should always be prioritized. The different states of the device will be presented alongside their expected behavior:

If the Device Load Balancer information is present, follow the protocol from the 'Connect' request.

If not, execute a 'Get Connection Information' request in order to obtain the Device Load Balancer information.

Additional information is available in the following section in case of failures during those calls.

Connection or Network Failure Scenarios:

These failure scenarios assume that the device is following the CBVSS Control Protocol correctly and that the information it transmits is correct as well but that a service is not responding or that there is a network problem. Typically, these transient errors will be reported by a HTTP code in the 500 range.

In case of any single failure of any type at any step the device logs it internally. These logs are made available for the integrator for troubleshooting purposes.

When the device is blocked at a certain step and multiple attempts have occurred, the device displays an error message in the user status page.

Figure 18:
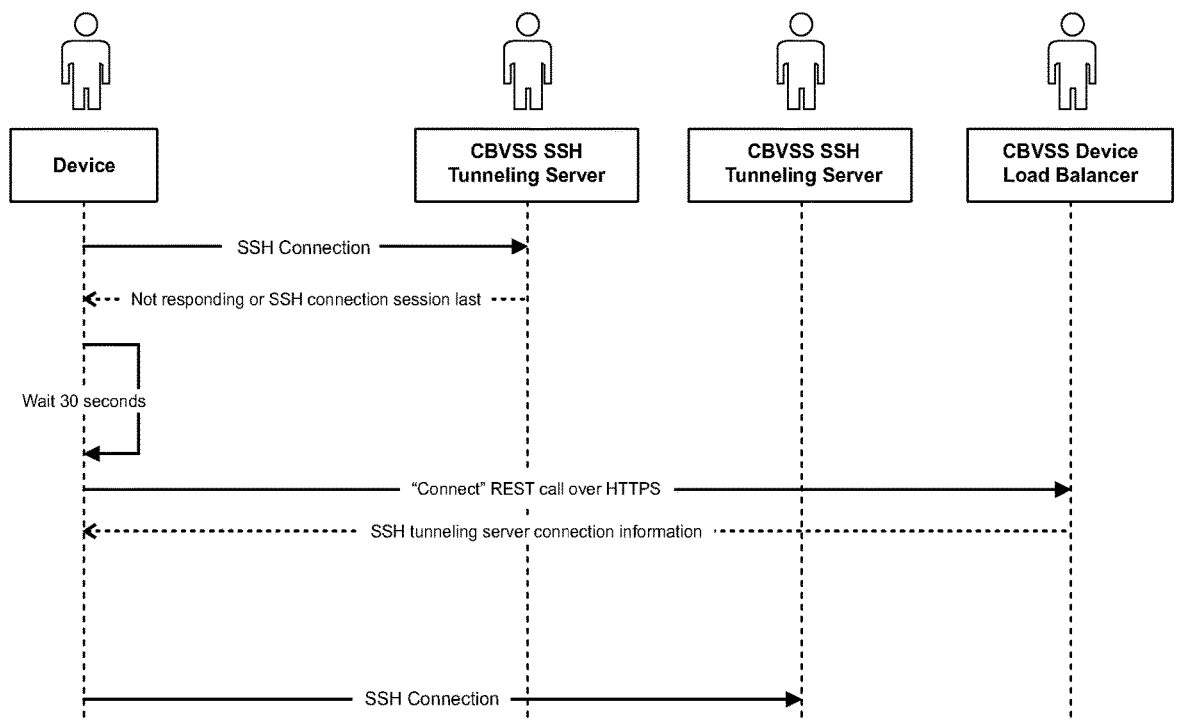
FIG. 18 is an event flow diagram illustrating the message flow between entities in the security system of FIG. 13, e.g. when a security server currently assigned to a security device does not respond to the connection request from the device.

FIG. 18 is an event flow diagram illustrating the message flow between entities in the security system of this example according to one particular exemplary scenario. It illustrates a scenario in which the SSH server known to the camera does not respond. After a timeout period, the camera contacts the load balancer to get a new SSH server to which the camera can connect.

Scenarios:

If the device is trying to 'Get NTP Server' from the 'Enrolment Service' and it fails, it tries again after 30 seconds and logs the error internally. After 5 attempted failures it displays an error message in the user status page.

If the device is trying to 'Register Device' from the 'Enrolment Service' and it fails, it tries again after 30 seconds and logs the error internally. After 5 attempted failures it displays an error message in the user status page.

If the device is trying to 'Get Connection Information' from the 'Enrolment Service' and it fails, it tries again after 30 seconds and logs the error internally. After 5 attempted failures it displays an error message in the user status page.

If the device is trying to 'Get SSH Server Info' from the 'Device Load Balancer' and it fails, it tries again after 30 seconds and logs the error internally. After 5 attempted failures it displays an error message in the user status page.

If the device is trying to 'Establish an SSH Connection session' with the 'Device Gateway' and it fails, it tries again to 'Get SSH Server Info' from the 'Device Load Balancer' after 30 seconds and logs the error internally. After 5 attempted failures it displays an error message in the user status page.

Factory Reset:

A factory reset may be performed by the user. In order to facilitate recovery after a factory reset it is required that the manufacturer keeps the CBVSS application operational including the device SSH public and private keys. This allows the device to reconnect automatically until the user explicitly removes it from the CBVSS.

Figure 26:
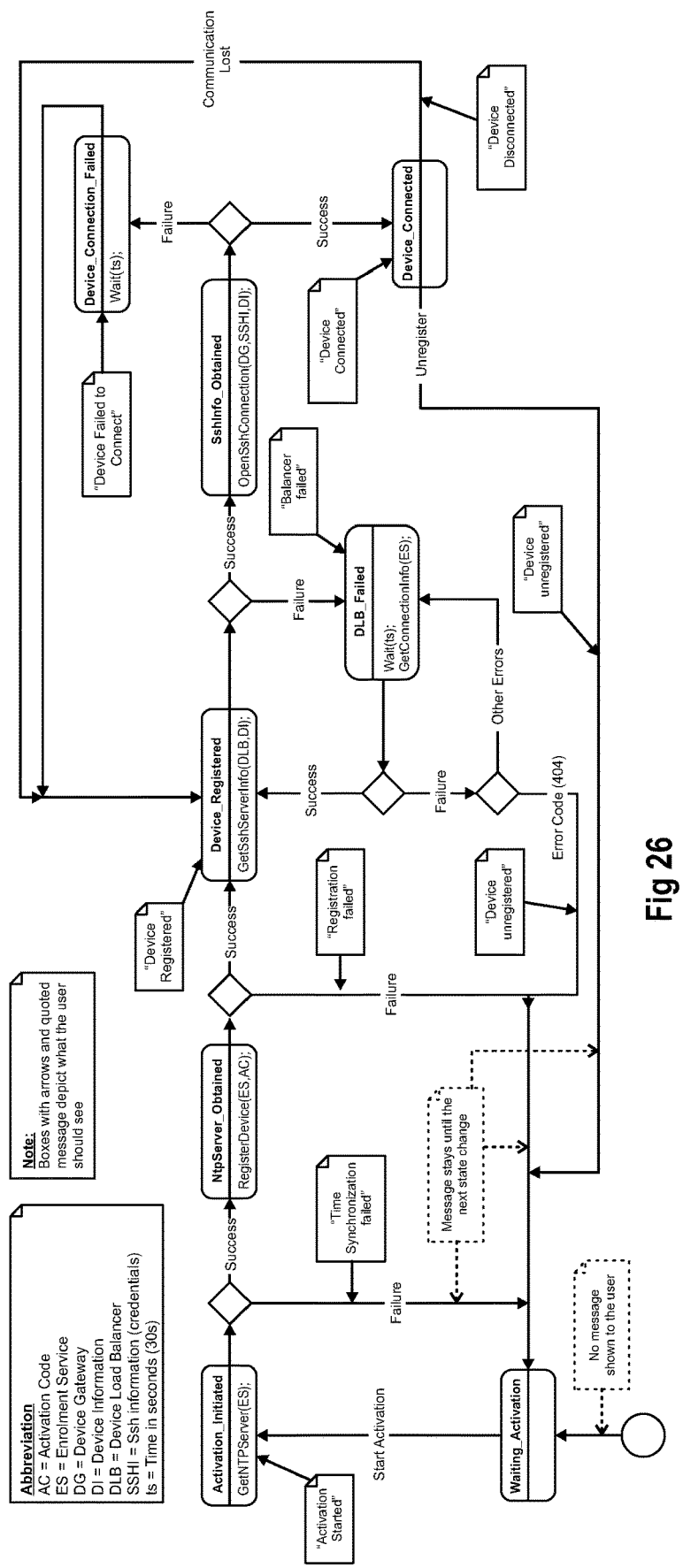
FIG. 26 shows a camera's different states across its lifecycle within the CBVSS. The squared bubbles define each state while the notes indicate the message that the camera displays to the user when in that state.

Statuses of a Device:

FIG. 26 shows different states of a security device during its lifecycle with the CBVSS in a finite state machine. In this example, the device already has a CBVSS enabled package or firmware as described herein installed in its memory. The messages are important to the user as they help assess the status of the device not only during the activation, enrolment or registration, but at any given moment during the use of the device.

Security Implementation:

Introduction

Every request made against a CBVSS service in this example is authenticated. Now for this present example for this section, the CBVSS services of this example support HTTPS and any HTTP request will be rejected, although other implementations may differ as discussed.

An authenticated request according to the exemplary implementation has at least four headers: the Date or x-CBVSS-date header, the version or x-CBVSS-version header, the Authorization header that contains reference(s) to other custom authorization header(s), and the custom authorization header(s).

Depending on the API you are calling, one may add only manufacturer or both the manufacturer and camera signatures.

The following example shows how these headers might look like.

```
x-CBVSS-date: Thu, 12 Feb 2015 13:47:51 GMT
x-CBVSS-version: 2015-02-10
Authorization-Manufacturer: [manufacturer account name]:[signature]
Authorization: CBVSSAuth Manufacturer
```

```
    x-CBVSS-date: Thu, 12 Feb 2015 13:47:51 GMT
    x-CBVSS-version:    2015-02-10Authorization-Manufacturer:
    [manufacturer    account name]:[signature]
    Authorization-Camera: [camera unique id]:[signature]
    Authorization: CBVSSAuth Manufacturer:Camera
```

The following sections describe how to construct these headers.

Specifying the Date Header:

All authenticated requests must include the Coordinated Universal Time (UTC) timestamp for the request.

One can specify the timestamp in the x-CBVSS-date header.

The date/time in this example is in full date format from RFC 822, updated by RFC 1123.

For example: x-CBVSS-date: Sun, 6 Nov. 1994 08:49:37 GMT

Specifying the Version Header:

All authenticated requests must include the version header. The authentication version can be specified in the x-CBVSS-version header.

The current version of the CBVSS authentication is 2015-02-10.

For example: x-CBVSS-version: 2015-02-10

Creating the Public and the Private Keys:

To make a request against CBVSS services, a string signature is constructed and sign with both the manufacturer and camera keys. To sign the string, a private key is used on the client side and to verify, a public key is used on the server side. Open SSL can be used to create the public and private keys.

To create the public and the private keys, the following commands can be used in Open SSL.

```
openssl genrsa -out camera_private.pem 4096
openssl rsa -pubout -in camera_private.pem -out camera_public.pem
```

Specifying the Authorization Header:

An authenticated request includes the Authorization header. If this header is not included, the request is anonymous and will be rejected under the present example.

To authenticate a request, the request is signed with the key for the account that is making the request and that signature is passed as part of the request.

Depending on the API being called, one may add only manufacturer or both the manufacturer and camera signatures The format for the Authorization header can be as follows:

```
Authorization: CBVSSAuth ReferenceIdentifier1: ReferenceIdentifier1:
Examples:
Authorization: CBVSSAuth Manufacturer or
Authorization: CBVSSAuth Manufacturer:Camera
```

Where CBVSSAuth is the name of the authorization scheme, and reference identifier(s) is a reference to another header that contains the signature(s).

The format of referenced authorization header can be as follows:

```
Authorization-ReferenceIdentifier: [account]:[signature]
Examples:
Authorization-Manufacturer: [manufacturer account name]:[signature]
``` or

Authorization-Camera: [Camera Unique Id]: [Signature]

[manufacturer account name] and [camera unique id] are the corresponding name of the manufacturer and the camera unique id requesting the resource, and the signature is computed using the signature API on RSA crypto algorithm with the SHA256 hash, and the result of it is then encoded in Base64.

The manufacturer account name and camera unique id are in lower case in this example.

The following sections describe how to construct the referenced authorization header according to the present exemplary embodiment.

Constructing the Signature String:

To encode the CBVSSAuth Key signature string, use the following format:

```
StringToSign = VERB + "\n" +
    Content-Encoding + "\n"
    Content-Language + "\n"
    Content-Length + "\n"
    Content-MD5 + "\n" +
    Content-Type + "\n" +
    Date + "\n" +
    CanonicalizedHeaders + "\n" +
    CanonicalizedResource;
```

When constructing the signature string, the following applies:
1. The VERB portion of the string is the HTTP verb, such as GET or PUT, and is uppercase.
2. Each header included in the signature string may appear only once.
3. The values of all standard HTTP headers (Content-Encoding, Content-Language, Content-Length, Content-MD5, Content-Type, Date) is included in the string in the order shown in the signature format, without the header names. These headers may be empty if they are not being specified as part of the request; in that case, only the new line character may be present.
4. All new line characters (\n) shown are required within the signature string.

The following example shows how signature string might look like.

```
GET\n\n\n\n\ntext/xml; encoding='utf-8'\n\nx-CBVSS-date:Thu,
12 Feb 2015 13:47:51 GMT\nx-CBVSS-version:2015-02-
10\n/manufacturer/[manufacture account name]/api/2015-02-
10/system/ntp/[manufacture account name]/[camera unique id]
```

And the expanded version:

```
GET
text/xml; encoding='utf-8'
x-CBVSS-date:Thu, 12 Feb 2015 13:47:51 GMT
x-CBVSS-version: 2015-02-10
/manufacturer/[manufacture account
name]/api/2015-02-10/system/ntp/[manufacture account
name]/[camera unique id]
```

Below is provided detailed information on Constructing the Canonicalized Headers String and Constructing the Canonicalized Resource String that make up part of the signature string.

Constructing the Canonicalized Headers String:
To construct the CanonicalizedHeaders portion of the signature string, one may follow these steps:
1. Retrieve all headers for the resource that begin with x-CBVSS-, including the x-CBVSS-date and x-CBVSS-version headers.
2. Convert each HTTP header name to lowercase.
3. Sort the headers lexicographically by header name, in ascending order. Note that each header may appear only once in the string.
4. Unfold the string by replacing any breaking white space with a single space.
5. Trim any white space around the colon in the header.
6. Finally, append a new line character to each canonicalized header in the resulting list. Construct the CanonicalizedHeaders string by concatenating all headers in this list into a single string.

The following example shows how Canonicalized Headers String might look like.

x-CBVSS-date:Thu, 12 Feb 2015 13:47:51 GMT

Constructing the Canonicalized Resource String
The CanonicalizedResource part of the signature string represents the resource targeted by the request.

Any portion of the CanonicalizedResource string that is derived from the resource's URI may be encoded exactly as it is in the URI.

It is possible to construct the CanonicalizedResource string in this format as follows:
1. Beginning with an empty string (" "), append a forward slash (/), followed by:
   a. If the API call requires only manufacturer signature: the word "Manufacturer", append a forward slash (/), the manufacturer account name.
   b. If the API call requires both manufacturer and camera signature: the word "Camera", append a forward slash (/), the camera unique id, append a forward slash (/), the word "Manufacturer", append a forward slash (/), the manufacturer account name.
2. Append the resource's encoded URI path, without any query parameters.

```
https://spenrolment.CBVSSdev.net/api/2015-02-10/system/ntp/
[manufacture        account name]/[device unique id]?...
The encoded URI path, without any query parameters:
/api/2015-02-10/system/ntp/[manufacture account name]/[device
unique id]
```

3. Retrieve all query parameters on the resource URI, including the comp parameter if it exists.
4. Convert all parameter names to lowercase.
5. Sort the query parameters lexicographically by parameter name, in ascending order.
6. URL-decode each query parameter name and value.
7. Append each query parameter name and value to the string in the following format, making sure to include the colon (:) between the name and the value:

parameter-name: parameter-value

8. If a query parameter has more than one value, sort all values lexicographically, then include them in a comma-separated list:

parameter-name: parameter-value-1,parameter-value-2,parameter-value-n

9. Append a new line character (\n) after each name-value pair.

Keeping in mind the following rules for constructing the canonicalized resource string:
1. Remove the new line character (\n) in values for query string. If it must be used, ensure that it does not affect the format of the canonicalized resource string.
2. Remove commas in query parameter values.

The following example shows how Canonicalized Headers String might look like.

/manufacturer/[manufacturer account name]/api/2015-02-10/
system/ntp/[manufacturer account name]/[camera unique id]

Encoding the Signature:
To encode the signature, one may call the SHA256 algorithm on the UTF-8-encoded signature string and encode the result as Base64. Use the following format (shown as pseudocode):

Signature=Base64(RSA(SHA256)(UTF8(StringToSign)))

CBVSS Protocol Reference Design:

Environment Preparation:

Install Cygwin & OpenSSH:

The Unit Simulator in this example uses Cygwin and Open SSH to connect to the CBVSS SSH Server.

One may download Cygwin from this link: https://cygwin.com/install.html (choose the 32-bit package).

Figure 19:
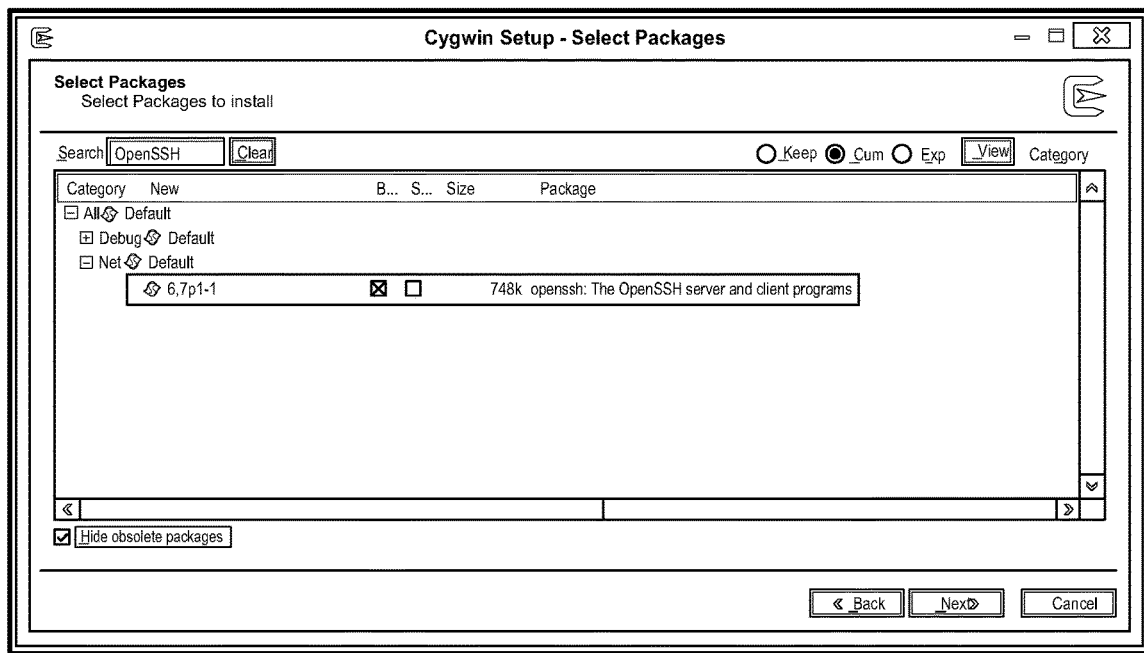
FIG. 19 is a setup screen screenshot showing the openssh package selection screen according to the example of FIG. 13.

One may install OpenSSH by selecting the openssh package from the available package list (see FIG. 19).

Install OpenSSL:

One may download OpenSSL from this link: http://indy.fulgan.com/SSL/

This version or one equivalent: openssl-1.0.2-i386-win32.zip may be selected for this example.

Once the download is completed, one may follow the installation wizard.

Setup Camera Sample:

Configuration File: In this example, the configuration file template can be located in the ABCinc.CBVSS.CameraSample project, and the name of the file may be something like: Configuration.xml.

In one exemplary embodiment, there may be (2) main configuration section in this file:

1. CameraSampleConfiguration; containing the configurations needed by the CBVSS protocol to establish the communication with the server.

| | |
|---|---|
| CygwinFolder | The folder where Cygwin.bat is located. |
| OpenSslFolder | The folder where openssl.exe is located. |
| CBVSSProtocolVersion | First version number of the CBVSS protocol. |
| EnrolmentServiceUrl | A development enrolment service url. |
| ManufacturerAccountName | A development manufacturer name. |
| SshConnectionTimeout | Timeout in seconds. |
| CBVSSControlProtocolPort | The camera sample will open this port as an http endpoint to get requests from the SSH server. |

2. RealCameraConfiguration; contains the configurations of what would be a real camera.

| | |
|---|---|
| MacAddress | The MAC address of the camera |
| IpAddress | The IP address of the camera |
| Password | Password that is going to be used by an archiver to control the camera (must exist on the camera) |
| Username | Username that is going to be used by an archiver to control the camera (must exist on the camera) |
| FirmwareVersion | The firmware version of the camera |
| ProprietaryProtocolPort | The CBVSS manager's (e.g. ABCInc's) protocol's port. |

In Visual Studio: One may then build and run the project: ABCInc.CBVSS.CameraSample 1. Click on "Get an activation code for this camera"
2. A web browser may then open with one's camera information already in the page parameters.
3. Click on "Enroll" to launch the enrolment progress and to get an activation code.

CBVSS Protocol Implementation:

Step 1—GetNtpServerinfo:

Call to the Enrolment Service for the NTP Server URL to use for time synchronization. The Enrolment Service URL can be found in the configuration.xml file.

| | |
|---|---|
| Method | GET |
| URL | Enrolment Service URL + /api/{DeviceProtocolVersion}/system/ntp/{ManufacturerId}/{DeviceId} |
| Result | NTP Server URL |

The returned URL may be saved to the volatile memory of the camera.

Step 2—SyncUnitTime:

Using the NTP Server URL saved in the volatile memory in step 1, the camera may sync its internal clock to the provided NTP Server.

Step 3—GenerateDeviceKeys:

Generate the SSH Keys to be used by the camera in the enrolment process when communicating with the different services. Once the command is ready, it may be launched in a Cygwin process. The result will be a file containing the RSA 2048 bits public and private keys.

Persist the keys for later use.

Step 4—RegisterDevice:

Call to the Enrolment Service to register the device. The Enrolment Service URL can be found in the configuration.xml file

| | |
|---|---|
| Method | POST |
| URL | Enrolment Service URL + /api/{DeviceProtocolVersion}/device/register/{ManufacturerId}/{DeviceId} |
| Result | Device Load Balancer URL |

When enrolling a device, the unit will also receive de Device Load Balancer URL in this exemplary implementation. This information should be persisted through a camera reset. It is used to dispatch the camera to the right instance of SSP.

Step 5—GetSshServerinfo:

Connect to the Device Load Balancer to get the SSH Tunneling Server information. The Device Load Balancer URL is received in step 4.

| | |
|---|---|
| Method | POST |
| URL | Device Load Balancer URL + /api/{DeviceProtocolVersion}/device/connect/{ManufacturerId}/{DeviceId} |
| Result | SSH server address |

Step 6—CreateSshConfigFiles:

Two (2) files need to be created for this step. "config" and "known hosts". The files will be used by the OpenSSH client to open the SSH connection with the server in step 8.

The "config" file contains information kept in the volatile memory such as:

SSH Server Address

SSH Port

SSH Username

The configuration file path

SSH connection timeout

The known_hosts file path

The list of remote port

The SSH CBVSS Control Protocol Remote Port

Proprietary Protocol Remote Port

All additional services.

The "known hosts" file contains:
SSH Server Address
SSH Server Public Key
Those files should be saved.
Step 7—OpenHttpListner:
Start an Http Listener (System.Net.HttpListener) for the CBVSS Control Protocol to communicate on.
Step 8—OpenSshConnection:
Open the SSH connection to the SSH server. Some commands are needed to successfully open the connection with the server.
(the following commands are example)
Change the path where the public and private key files were saved.
cd 'filePath'
1. Grant read and write permission on private key for owner only.
chmod 600 ssh_filename
2. Grant read and write permission for owner and read permission for everyone else on public key file.
chmod 644 ssh_filename.pub
3. Start the SSH agent.
eval 'ssh-agent -s'
4. Add the generated keys to SSH
ssh-add 'filePath'
5. Open the SSH connection to the server based on the configuration files generated in step 6.
ssh ssh-server -F 'config' -N
Once every commands above are executed, the SSH tunnel should be successfully established with the server.

Figure 21:
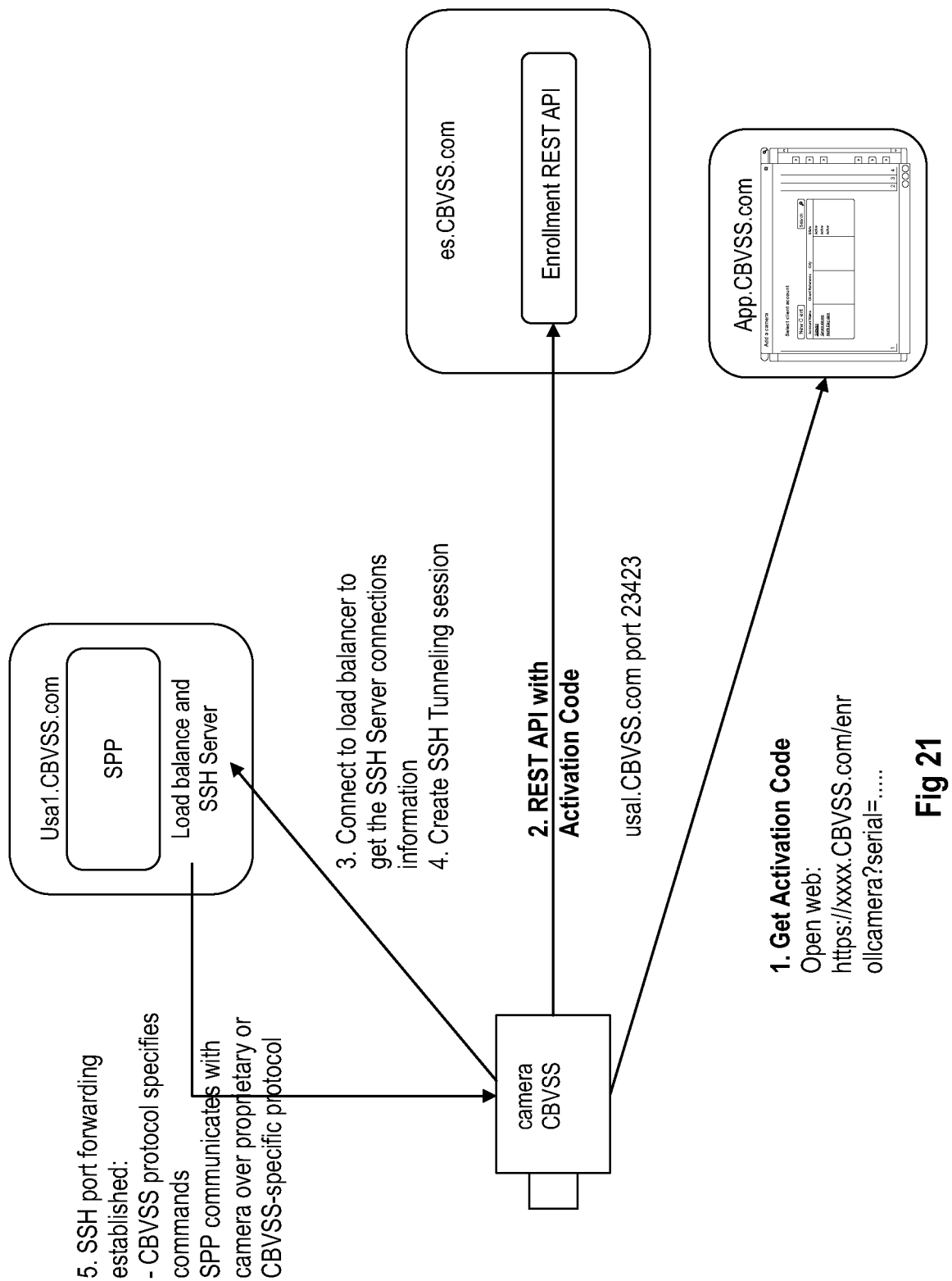
FIG. 21 is a block diagram illustrating in part the CBVSS registration system according to the example of FIG. 13.

FIG. 21 is a block diagram illustrating in part the CBVSS registration system according to the present example.

Figure 22:
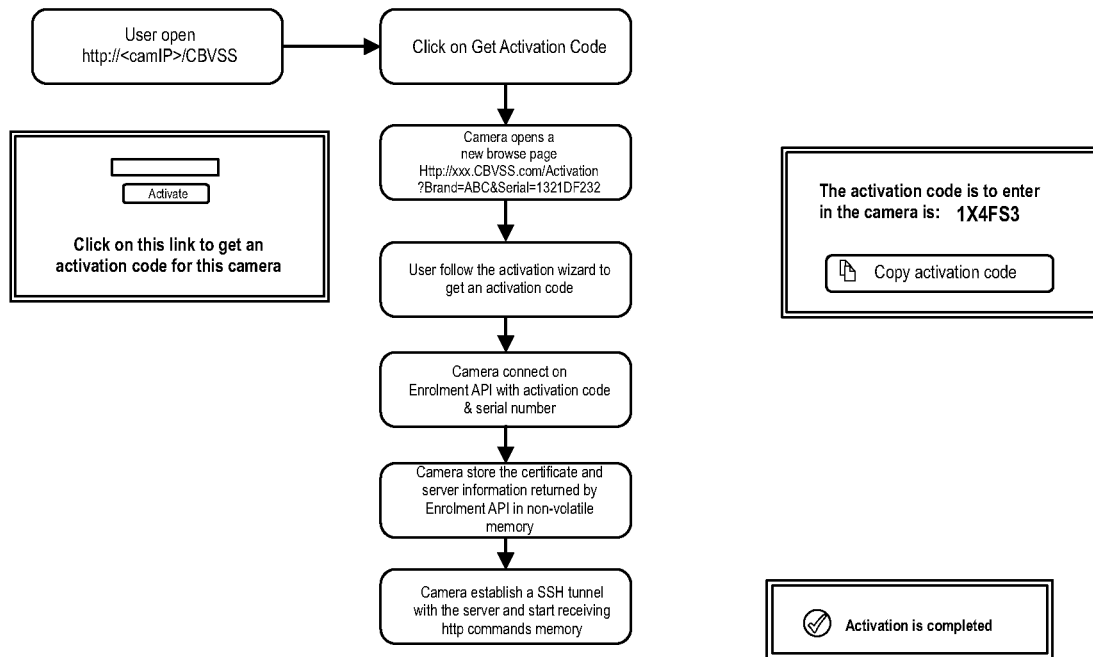
FIG. 22 is a flow chart showing the steps of registering a camera according to the example of FIG. 13.
Figure 23:
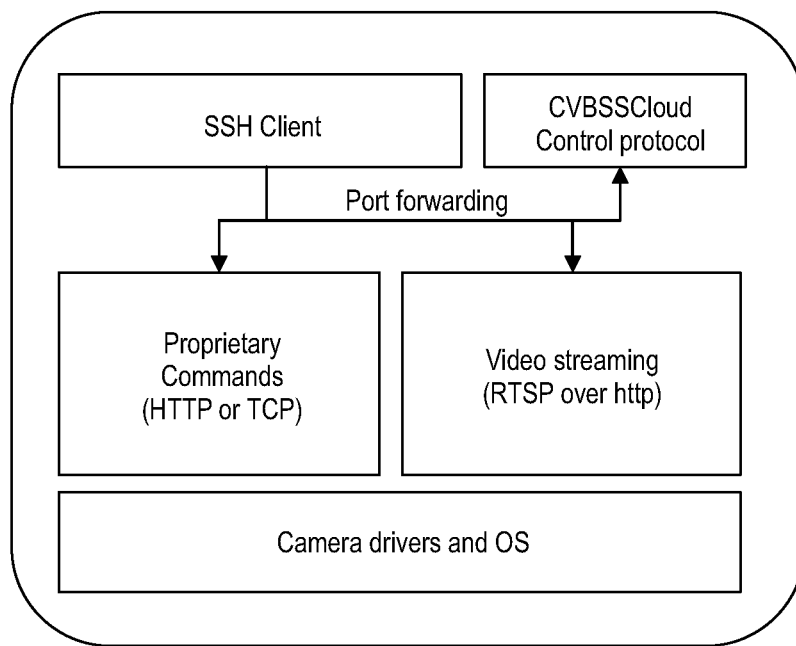
FIG. 23 is a block diagram illustrating certain elements of the camera of the example of FIG. 13.
Figure 24:
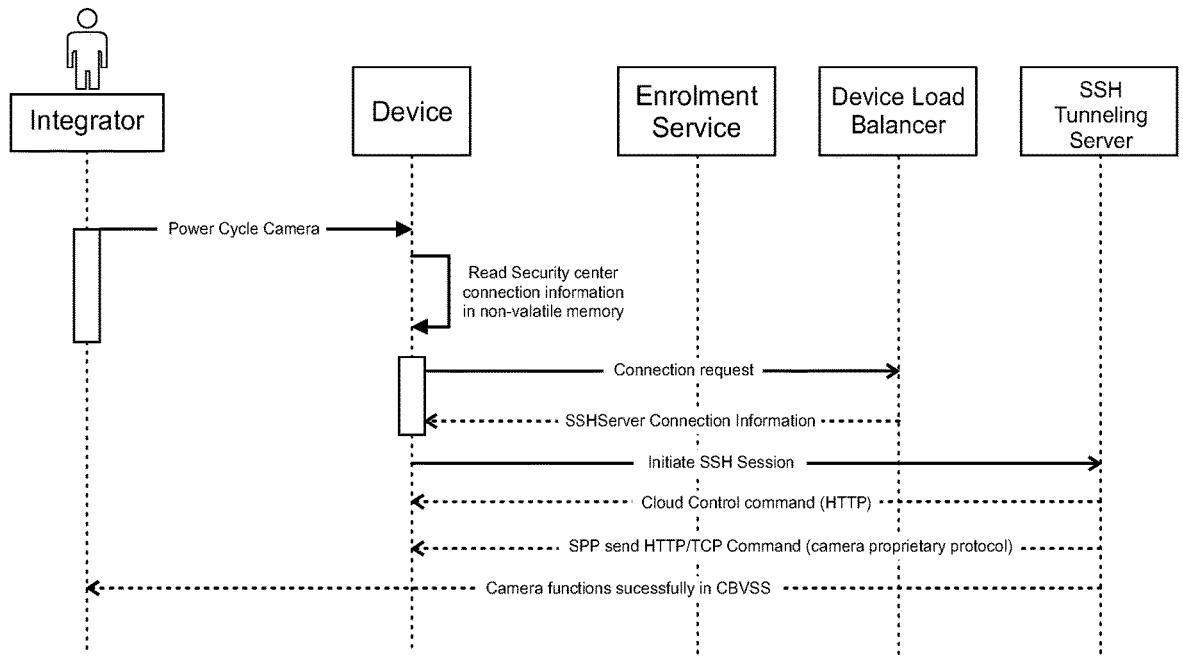
FIG. 24 shows an event flow diagram showing interactions between the elements of the system of FIG. 13.

Some of the Many Benefits of the CBVSS:
Simple
Simple enrollment of IP Security appliances over the cloud
No port forwarding, fix IP required or DNS service.
Simple to implement in the device's firmware
No extra steps at the device factory
No extra button on the device required to activate
(See FIG. 22 which is a flow chart showing the steps of registering a camera according to the present example.)
Secure
1. Authenticated communications with certificate exchanges
2. Encrypted tunnel over the internet
Flexible
Tunneling protocol that encapsulates any proprietary or open security protocol over HTTP In one particular exemplary embodiment, the device may include the modules shown in FIG. 23 where:
SSH client: receive and replay HTTP/TCP requests received from the CBVSS, with CBVSS being compatible with OpenSSH and DropbearSSH, and
CBVSS protocol implementation: get the server address and reconnection logic certificate to authenticate to CBVSS extra http commands to implement CBVSS specific functionalities Although various embodiments have been illustrated, this was for the purpose of describing, but not limiting, the present invention. Various possible modifications and different configurations will become apparent to those skilled in the art and are within the scope of the present invention, which is defined more particularly by the attached claims.

The invention claimed is:

1. A method for establishing a secure connection between a network-enabled security device and a security server to enable communication of encrypted security data from the security device to the security server, the method comprising:
   a. providing an enrolment server on a public network having a known network address;
   b. over a first network connection using a network communication protocol between the enrolment server and a computing device, receiving at the enrolment server from the computing device authentication data;
   c. at the enrolment server executing program code to automatically authenticate the first network connection on the basis of the authentication data and upon authentication of the first connection, transmit an activation code to the computing device;
   d. over a second network connection between the enrolment server and the security device, receiving at the enrolment server from the security device the activation code and a public encryption key of the security device;
   e. at the enrolment server executing program code to automatically verify that the activation code received from the security device matches the activation code transmitted to the computing device, and upon successful verification that the activation code received from the security device matches the activation code transmitted to the computing device creating in a computer-readable memory a consultable indication that the security device has been authenticated, wherein a security data transmission from the security device is authenticated by consulting the indication to confirm that the security device has been authenticated.

2. The method of claim 1, wherein creating in a computer-readable memory a consultable indication that the security device has been authenticated comprises transmitting said indication to a second server and wherein said consulting the indication to confirm that the security device has been authenticated is performed at said second server.

3. The method of claim 1, further comprising, upon successful verification that the activation code received from the security device matches the activation code transmitted to the computing device, transmitting to the security device connection parameters for establishing the security data transmission.

4. The method of claim 1, wherein the activation code is a single-use activation code and wherein automatically verifying that the activation code received from the security device matches the activation code transmitted to the computing device comprises executing program code to verify that the activation code has not been previously used.

5. The method of claim 1, wherein automatically verifying that the activation code received from the security device matches the activation code transmitted to the computing device further comprises executing program code to automatically verify whether the activation code was transmitted within a maximum period.

6. The method of claim 1, further comprising receiving over the first network connection from the computing device surveillance context information concerning the network security device; and
further comprising upon verification that the activation code received from the security device matches the activation code transmitted to the computing device, associating the context information with the security device.

7. A method for enabling surveillance communication between a network-enabled security device and a security server comprising:

a. establishing a data connection with a computing device and
   i. transmitting from the security device to the computing device over the data connection between the security device and the computing device enrolment connection parameters with which to provide the computing device with network communication with an enrolment server; and
   ii. receiving at the security device over the data connection between the security device and the computing device an activation code from the computing device;
b. establishing network communication with an enrolment server on a public network using a network protocol and transmitting to the enrolment server the activation code received from the computing device and a public encryption key from a public-private encryption key pair;
c. receiving over the public network from the enrolment server surveillance connection parameters for establishing a connection with the security server; and
d. establishing network communication between the security device and the security server using the surveillance connection parameters received from the enrolment server and transmitting to the security server security data signed with a private encryption key from the public-private encryption key pair.

8. The method of claim 7, wherein the data connection between the security device and the computing device is a network connection and wherein the security device is a web server to the computing device and wherein transmitting the enrolment connection parameters comprises causing a web browser running on the computing device to connect to the enrolment server.

9. The method of claim 7, wherein the enrolment connection parameters comprise a unique camera identifier associated with a network camera.

10. The method of claim 7, wherein the surveillance connection parameters comprise a surveillance server address corresponding to a surveillance server unit;
   establishing network communication between the security device and the security server comprises
      a. establishing a connection with a load balancing server using the surveillance connection parameters;
      b. receiving from the load balancing server secondary surveillance connection parameters; and
      c. establishing a connection with the security server using said secondary surveillance connection parameters;
   and
      the surveillance connection parameters comprise a network address of the load balancing server and said secondary surveillance parameters comprise a network address of the security server.

11. The method of claim 7, executed on the security device wherein:
a. establishing a data connection with a computing device comprises establishing the data connection between the security device and the computing device and receiving at the security device over the data connection the activation code from the computing device;
b. establishing a network communication with an enrolment server comprises establishing the network communication between the security device and the enrolment server using a network protocol and transmitting from the security device to the enrolment server the activation code received from the computing device and the public encryption key belonging to the security device;
c. receiving over the public network from the enrolment server surveillance connection parameters comprises receiving at the security device over the public network from the enrolment server the surveillance connection parameters; and
d. transmitting to the security server security data signed with the private encryption key comprises transmitting from the security device to the security server security data signed with the private encryption key of the security device.

12. An enrolment server for establishing a secure connection between a network-enabled security device and a security server to enable communication of encrypted security data from the security device to the security server, comprising:
a. network interface hardware configured for communication over a data network;
b. a processing device in communication with the network interface hardware and configured by program code stored in a computer-readable storage accessible by the processing device instructing the processing device to:
   i. establish a first network connection over the network interface hardware using a network communication protocol with a remote computing device;
   ii. process data received from the remote computing device over the first network connection to derive therefrom authentication data provided in the data received from the remote computing device;
   iii. perform an authentication of the first network connection on the basis of the authentication data;
   iv. upon authentication of the first connection, cause the network interface hardware to transmit to the computing device an activation code;
   v. establish a second network connection over the network interface hardware with the security device;
   vi. process data received from the security device over the second network connection to derive therefrom the activation code and a public encryption key of the security device provided in the data received from the security device;
   vii. perform a verification that the activation code received from the security device matches the activation code transmitted to the computing device, and upon successful verification that the activation code received from the security device matches the activation code transmitted to the computing device create in a computer-readable memory a consultable indication that the security device has been authenticated, wherein a security data transmission from the security device is authenticated by consulting the indication to confirm that the security device has been authenticated.

13. The enrolment server of claim 12, wherein creating in a computer-readable memory a consultable indication that the security device has been authenticated comprises transmitting said indication to a second server over the network interface hardware and wherein said consulting the indication to confirm that the security device has been authenticated is performed at said second server.

14. The enrolment server of claim 12, wherein the processing device is further configured by said program code to, upon successful verification that the activation code received from the security device matches the activation code transmitted to the computing device, transmit, to the security device, connection parameters for establishing the security data transmission.

15. The enrolment server of claim 12, wherein the activation code is a single-use activation code and wherein the verification that the activation code received from the security device matches the activation code transmitted to the computing device comprises executing program code to perform a verification that the activation code has not been previously used.

16. The enrolment server of claim 12, wherein the processing device is further configured by said program code to receive over the first network connection from the computing device surveillance context information concerning the network security device; and the processing device is further configured by said program code to upon verification that the activation code received from the security device matches the activation code transmitted to the computing device, associate the context information with the security device.

17. A network-enabled security device for securely transmitting security data to a security server over a public network comprising:
   a. network interface hardware configured for communication over a data network;
   b. processing logic in communication with the network interface hardware and configured to:
      i. establish a data connection with a computing device and:
         1. transmit from the security device to the computing device over the data connection between the security device and the computing device enrolment connection parameters with which to provide the computing device with network communication with an enrolment server; and
         2. receive at the security device over the data connection between the security device and the computing device an activation code from the computing device;
      ii. establish network communication over the network interface hardware with the enrolment server on the public network using a network protocol and transmit to the enrolment server the activation code received from the computing device and a public encryption key from a public-private encryption key pair;
      iii. process data received from the enrolment server over the public network at the network interface hardware to derive therefrom the connection parameters for establishing a connection with the security server provided in the data received from the enrolment server; and
      iv. establish network communication over the network interface hardware with the security server on flail the public network using a network protocol using the connection parameters received from the enrolment server and transmit to the security server the security data encrypted using the connection parameters.

18. The security device of claim 17, wherein the processing logic is configured to establish the data connection between the security device and the computing device over the network interface hardware and to implement a web server to the computing device, and wherein the processing logic is configured to transmit the enrolment connection parameters by causing a web browser running on the computing device to connect to the enrolment server.

19. The security device of claim 17, the security device further comprising at least one security sensor for generating the security data, and wherein the public-private encryption key pair belongs to the security device and the processing logic is further configured to sign the security data generated by the at least one security sensor.

\* \* \* \* \*